United States Patent
Szmuk et al.

(10) Patent No.: US 12,330,783 B1
(45) Date of Patent: Jun. 17, 2025

(54) WEATHERVANING FOR HYBRID FLIGHT AIRCRAFT

(71) Applicant: Amazon Technologies, Inc., Seattle, WA (US)

(72) Inventors: Michael Szmuk, Seattle, WA (US); Daniel Robert Hentzen, Seattle, WA (US); Marco Antonio De Barros Ceze, Seattle, WA (US); Raghu Venkataraman, Seattle, WA (US); Umut Zalluhoglu, The Woodlands, TX (US); Christopher J. McFarland, Seattle, WA (US); Simone M. Airoldi, Melrose, MA (US); Kyle W. Reeve, Melrose, MA (US); Raymond H. Kraft, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 472 days.

(21) Appl. No.: 17/548,054

(22) Filed: Dec. 10, 2021

(51) Int. Cl.
*B64C 39/02* (2023.01)
*B64C 29/02* (2006.01)
*G05D 1/00* (2024.01)

(52) U.S. Cl.
CPC .............. *B64C 39/02* (2013.01); *B64C 29/02* (2013.01); *G05D 1/102* (2013.01); *B64U 2201/00* (2023.01)

(58) Field of Classification Search
CPC ........ B64C 39/02; B64C 29/02; G05D 1/102; B64U 2201/00
USPC .......................................................... 701/3
See application file for complete search history.

(56) References Cited

U.S. PATENT DOCUMENTS

| | | | | |
|---|---|---|---|---|
| 9,193,442 | B1 * | 11/2015 | Young | G08G 5/30 |
| 9,580,173 | B1 * | 2/2017 | Burgess | G05D 1/102 |
| 9,658,619 | B1 * | 5/2017 | Bethke | G05D 1/22 |
| 9,665,094 | B1 * | 5/2017 | Russell | B64U 10/14 |
| 9,938,001 | B1 * | 4/2018 | Parent | B64U 10/10 |
| 10,023,323 | B1 * | 7/2018 | Roberts | B64U 10/13 |
| 11,542,002 | B1 * | 1/2023 | Baumgartner | B64U 30/10 |
| 11,794,884 | B1 * | 10/2023 | Hinman | B64U 10/13 |

(Continued)

OTHER PUBLICATIONS

ArduPilot, "Weathervaning and Wind Hold," www.ardupilot.org, ArduPilot Dev Team, Copyright 2021, URL: https://ardupilot.org/plane/docs/quadplane-weathervaning.html (URL: https://github.com/ArduPilot/ardupilot_wiki/blob/master/plane/source/docs/quadplane-weathervaning.rst), obtained on Dec. 9, 2021, 3 pages.

(Continued)

*Primary Examiner* — Luis A Martinez Borrero
(74) *Attorney, Agent, or Firm* — Athorus, PLLC

(57) ABSTRACT

Described are systems and methods for active weathervaning of a hybrid flight aerial vehicle, such as an unmanned aerial vehicle (UAV). Active weathervaning of the hybrid flight aerial vehicle during can be provided during vertical takeoff and landing (VTOL)/hover flight without the assistance of any low-speed wind sensors and during transitions between VTOL/hover flight and fixed-wing, wing-borne, horizontal flight. Additionally, active weathervaning can be provided during propulsion mechanism failure conditions where the aerial vehicle may be experiencing failure conditions associated with one or more propulsion mechanisms.

20 Claims, 14 Drawing Sheets

(56) References Cited

U.S. PATENT DOCUMENTS

| | | | |
|---|---|---|---|
| 2010/0084513 A1* | 4/2010 | Gariepy | G05D 1/0094 244/190 |
| 2012/0056040 A1* | 3/2012 | Brotherton-Ratcliffe | B64D 27/10 244/75.1 |
| 2015/0153740 A1* | 6/2015 | Ben-Shachar | G05D 1/106 701/16 |
| 2015/0197335 A1* | 7/2015 | Dekel | B64U 30/10 701/5 |
| 2016/0247404 A1* | 8/2016 | Srivastava | G06Q 10/047 |
| 2018/0072414 A1* | 3/2018 | Cantrell | B64U 10/13 |
| 2019/0033889 A1* | 1/2019 | von Flotow | B64U 70/30 |
| 2019/0210725 A1* | 7/2019 | Cantrell | B64U 10/13 |
| 2019/0233099 A1* | 8/2019 | Lindsey | G05D 1/0816 |
| 2020/0033157 A1* | 1/2020 | Kaufman | G05D 1/0094 |
| 2020/0109944 A1* | 4/2020 | Zhang | G01C 5/06 |
| 2020/0142432 A1* | 5/2020 | Kwak | B60L 8/006 |
| 2020/0174499 A1* | 6/2020 | Motegi | G05D 1/0094 |
| 2020/0364456 A1* | 11/2020 | Tran | G06T 7/0004 |
| 2021/0068339 A1* | 3/2021 | He | B64D 1/16 |
| 2021/0362848 A1* | 11/2021 | Spencer | B64C 29/0033 |
| 2022/0089279 A1* | 3/2022 | Rosen | B64U 30/10 |
| 2022/0111960 A1* | 4/2022 | Tran | A01G 7/00 |
| 2022/0206514 A1* | 6/2022 | Tazume | G01S 17/933 |
| 2022/0250768 A1* | 8/2022 | Oshima | B64C 37/02 |
| 2022/0340300 A1* | 10/2022 | X | B64F 1/222 |
| 2022/0411053 A1* | 12/2022 | Baumgartner | B64D 9/00 |

OTHER PUBLICATIONS

PX4, "VTOL Weather Vane Feature," www.px4.io, last updated Dec. 3, 2020, Dronecode, Dronecode Project, Inc., a Linux Foundation Collaborative Project, www.dronecode.org, Copyright 2021, URL: https://docs.px4.io/v1.12/en/config_vtol/vtol_weathervane. html, obtained on Dec. 9, 2021, 2 pages.

* cited by examiner

WEATHERVANING FOR HYBRID FLIGHT AIRCRAFT

BACKGROUND

During flight, aircraft typically have preferred body orientations relative to the prevailing wind direction. The preferred body orientation can depend on characteristics associated with the aircraft (e.g., design of the aircraft, symmetries of the aircraft, aerodynamics associated with the aircraft, etc.), as well as parameters associated with the flight (e.g., propulsion/thrust settings, mode of flight-vertical takeoff and landing or fixed-wing, horizontal flight, and the like). Achieving the preferred orientation can be referred to as weathervaning. In this regard, aircraft can typically achieve the preferred orientation during flight passively or by employing sensors and systems to actively control the orientation of the vehicle. Achieving the preferred orientation may be more difficult for hybrid flight aircraft that can operate in both vertical takeoff and landing (VTOL) mode and fixed-wing, wing-borne, horizontal flight. This may be particularly true during transitions between VTOL/hover flight and fixed-wing, wing-borne, horizontal flight and for aircraft that do not employ low-speed wind sensors during VTOL/hover flight.

DETAILED DESCRIPTION

Figure 1A:
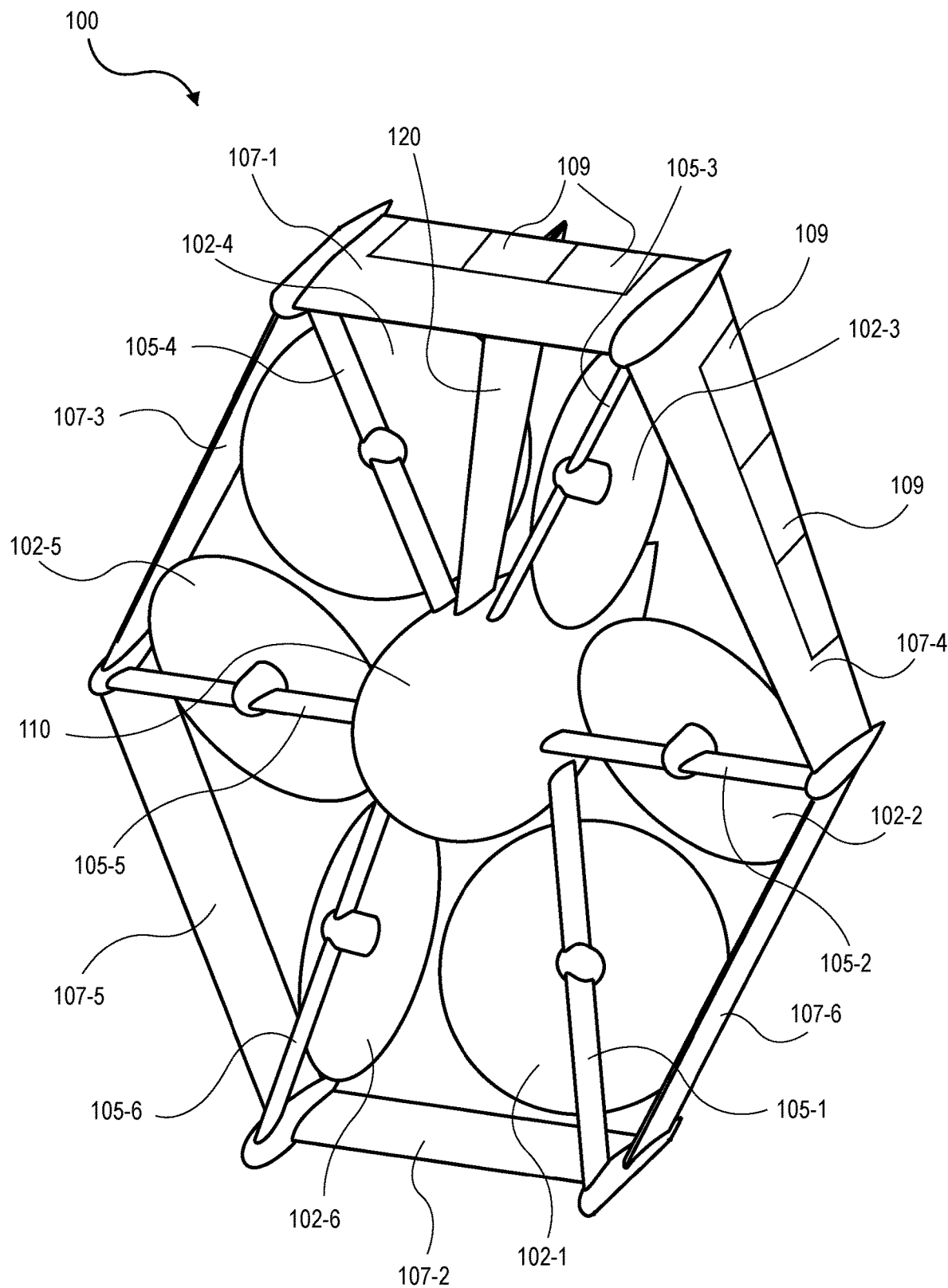
FIGS. 1A-1C are illustrations of an exemplary unmanned aerial vehicle (UAV), according to exemplary embodiments of the present disclosure.

As is set forth in greater detail below, embodiments of the present disclosure are generally directed to systems and methods for active weathervaning of a hybrid flight aerial vehicle, such as an unmanned aerial vehicle (UAV). Embodiments of the present disclosure can provide active weathervaning of the hybrid flight aerial during vertical takeoff and landing (VTOL)/hover flight without the assistance of any low-speed wind sensors and during transitions between VTOL/hover flight and fixed-wing, wing-borne, horizontal flight. Additionally, embodiments of the present disclosure can facilitate active weathervaning during propulsion mechanism failure conditions where the aerial vehicle may be experiencing failure conditions associated with one or more propulsion mechanisms. Active weathervaning without the assistance of additional wind sensors can advantageously reduce the complexity, weight, and cost of the aerial vehicle.

Embodiments of the present disclosure can provide systems and methods for facilitating active weathervaning in low-speed, VTOL/hover flight without the assistance of a low-speed wind sensor. According to exemplary embodiments of the present disclosure, a wind magnitude and direction may be determined based on feedback flight control information generated by the flight controller. For example, the feedback flight control information may include flight parameters associated with commands issued by the flight controller to mitigate tracking error while maintaining steady, low-speed, VTOL/hover flight. A wind estimate (e.g., direction and magnitude) can be inferred from the feedback flight control information and can be provided to the flight controller to actively align and orient the aerial vehicle in the preferred orientation relative to the inferred wind direction during VTOL/hover flight.

Embodiments of the present disclosure can also facilitate active weathervaning during VTOL/hover flight under certain failure conditions. According to exemplary embodiments of the present disclosure, a failure condition associated with one or more propulsion mechanisms of the aerial vehicle may first be identified. Based on the identified failure condition, the preferred orientation relative to the wind direction may be identified. The preferred orientation may be determined based on the failure condition (e.g., the number of propulsion mechanisms experiencing a failure condition and the location of the propulsion mechanisms experiencing a failure condition), as well as the design and characteristics of the aerial vehicle. Accordingly, a wind direction may be inferred from feedback flight control information relating to flight parameters associated with mitigating tracking error while maintaining steady, low-speed, VTOL/hover flight, and the flight controller may actively orient the aerial vehicle in the preferred orientation relative to the inferred wind direction based on the failure conditions.

In further exemplary embodiments of the present disclosure, active weathervaning during transitions between VTOL/hover flight and fixed-wing, wing-borne, horizontal flight may also be provided. According to exemplary embodiments of the present disclosure, a wind direction and magnitude estimate may be determined and latched prior to entering the transition between VTOL/hover flight and fixed-wing, wing-borne, horizontal flight. In exemplary implementations where the aerial vehicle is transitioning from VTOL/hover flight to fixed-wing, wing-borne, horizontal flight, the wind direction and magnitude is estimated from the feedback flight control information obtained from the flight controller during VTOL/hover flight may be latched prior to entering the transition from VTOL/hover flight to fixed-wing, wing-borne, horizontal flight. The latched wind estimate can be combined with the ground speed of the aerial vehicle to determine an inferred airspeed, which can be used to orient the aerial vehicle in the preferred orientation as the vehicle increases its airspeed to enter the transition from VTOL/hover flight to fixed-wing, wing-borne, horizontal flight. Once the aerial vehicle is in fixed-wing, wing-borne, horizontal flight, wind direction and magnitude may be determined based on information received from a plurality of sensors (e.g., Kiel probes, pitot tubes, global positioning system sensors, and the like). Accordingly, in exemplary implementations where the aerial vehicle is transitioning from fixed-wing, wing-borne, horizontal flight to VTOL/hover flight, the latest wind estimate determined during fixed-wing, wing-borne, horizontal flight can be latched prior to entering the transition from fixed-wing, wing-borne, horizontal flight to VTOL/hover flight. The latched wind estimate can be combined with the ground speed of the aerial vehicle to determine an inferred airspeed, which can be used to orient the vehicle through the transition to VTOL/hover flight and during a buffer period. The buffer period allows the feedback flight control information generated by the flight controller to stabilize before utilizing the feedback flight control information to infer a wind direction and magnitude for active weathervaning in VTOL/hover flight.

Figure 1B:
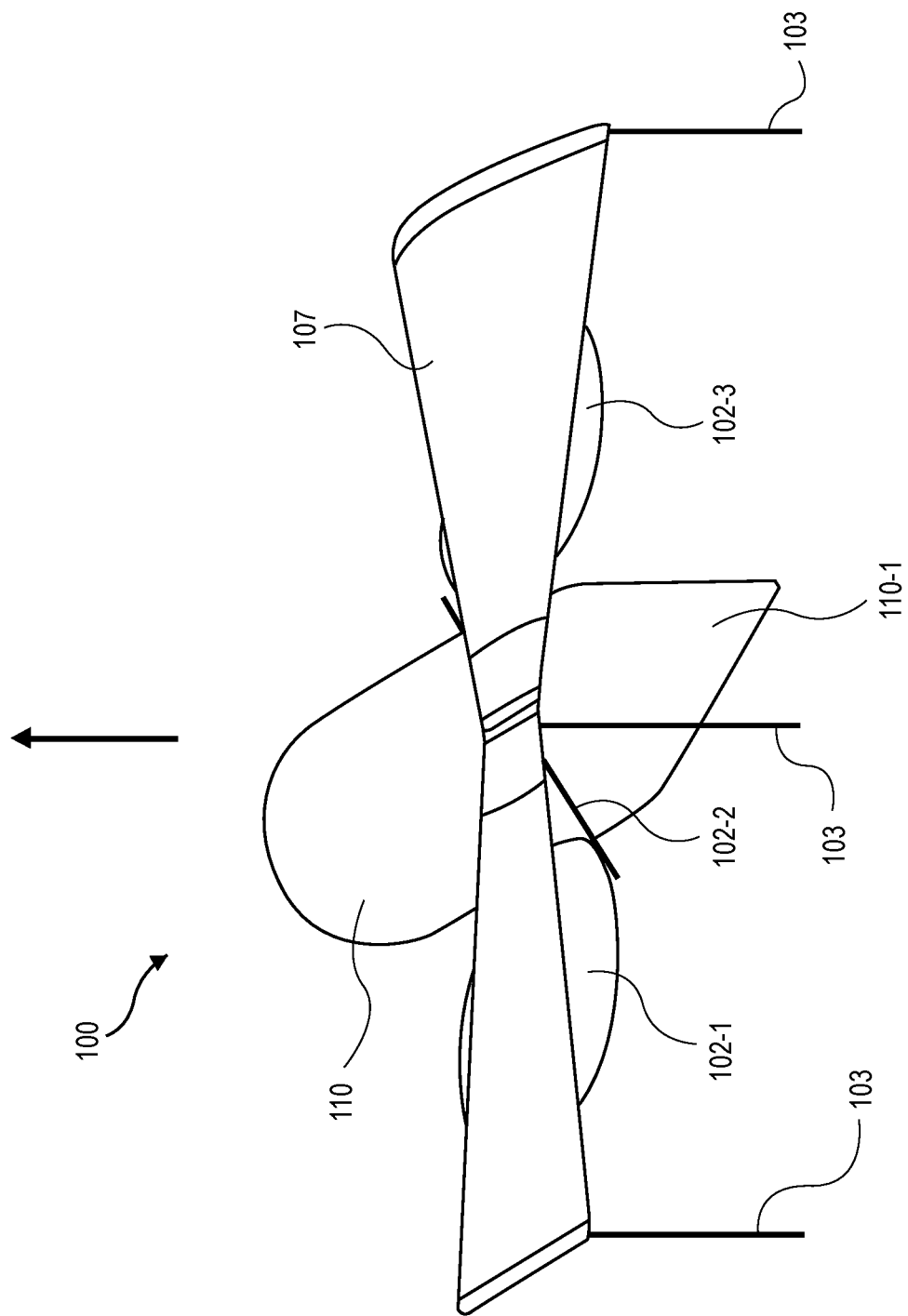
Figure 1C:
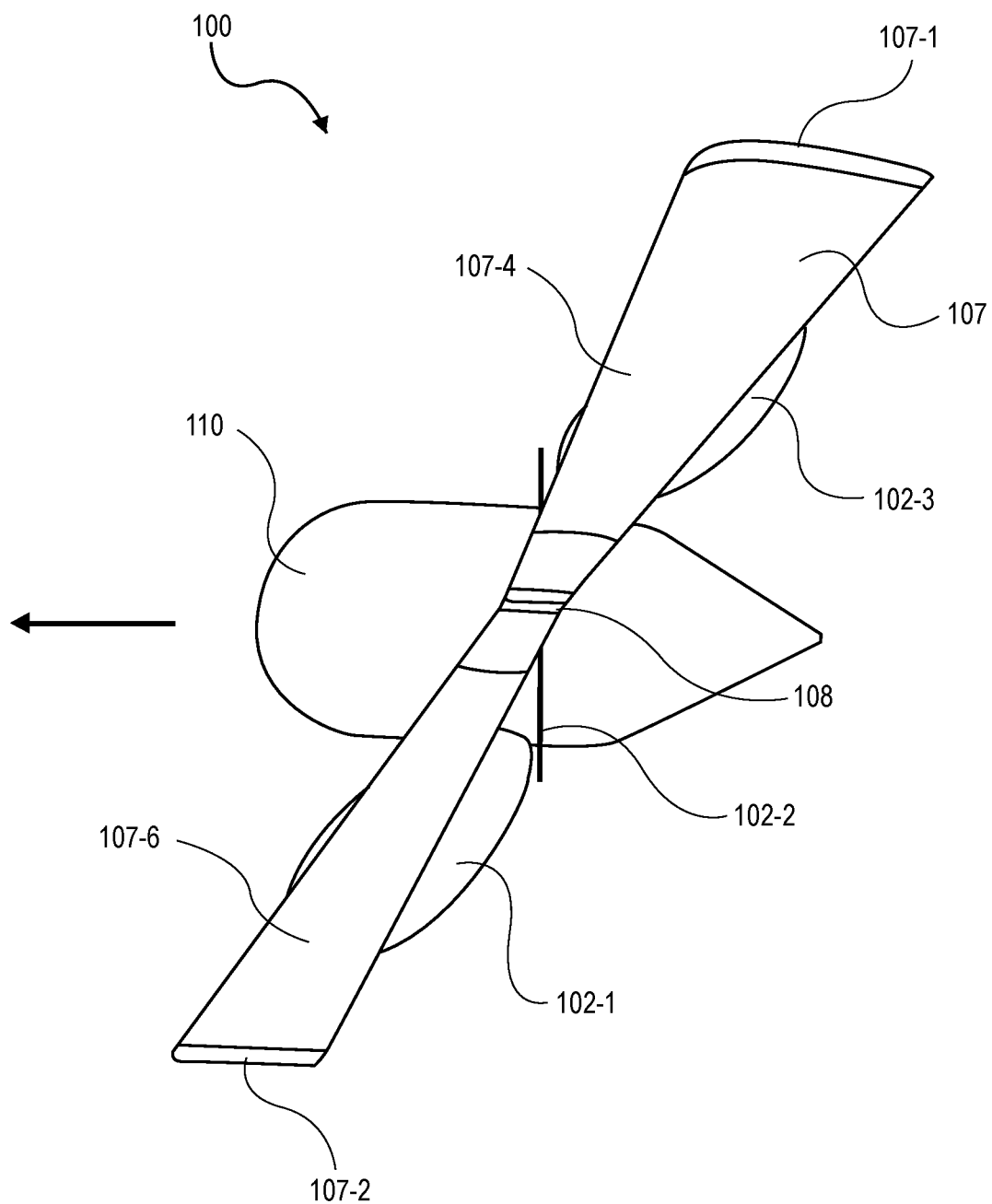

FIGS. 1A-1C illustrate an exemplary unmanned aerial vehicle 100, according to exemplary embodiments of the present disclosure.

As shown in FIG. 1A, aerial vehicle 100 may include a ring wing that is substantially hexagonal in shape and that surrounds a plurality of propulsion mechanisms. Aerial vehicle 100 may include six propulsion mechanisms 102-1, 102-2, 102-3, 102-4, 102-5, and 102-6 spaced about fuselage 110 of aerial vehicle 100. Propulsion mechanisms 102 may include motors, propellers, or any other form of propulsion. For example, one or more of propulsion mechanisms 102 of aerial vehicle 100 may utilize fans, jets, turbojets, turbo fans, jet engines, and/or the like to maneuver the aerial vehicle. Generally described, propulsion mechanism 102, as used herein, can include any form of propulsion mechanism that is capable of generating a force sufficient to maneuver aerial vehicle 100, alone and/or in combination with other propulsion mechanisms. Furthermore, in certain implementations, propulsion mechanisms 102 may be configured such that their individual orientations may be dynamically modified (e.g., change from VTOL/hover flight to fixed-wing, wing-borne, horizontal flight orientation) or any position therebetween.

Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

In this implementation, aerial vehicle 100 can also include ring wing 107 having a substantially hexagonal shape that extends around and forms the perimeter of aerial vehicle 100. In the illustrated example, ring wing 107 can include six segments 107-1, 107-2, 107-3, 107-4, 107-5, and 107-6 that are joined at adjacent ends to form the ring wing 107 around aerial vehicle 100. Each segment of ring wing 107 has an airfoil shape to produce lift when aerial vehicle 100 is oriented as illustrated in FIG. 1C and moving in a direction that is substantially horizontal. As illustrated, and discussed further below, the ring wing is positioned at a canted angle with respect to fuselage 110 such that lower segment 107-2 of ring wing 107 acts as a front wing as it is toward the front of the aerial vehicle when oriented as shown and moving in a horizontal direction. Upper segment 107-1 of ring wing 107, which has a longer chord length than lower segment 107-2 of ring wing 107, is positioned, in a horizontal orientation, further back relative to lower segment 107-2 and thus can act as a rear wing.

Ring wing 107 can be secured to fuselage 110 by motor arms 105. In this example, motor arms 105-1, 105-2, 105-3, 105-4, 105-5, and 105-6 are coupled to fuselage 110 at one end and are coupled to ring wing 107 at a second end, thereby securing ring wing 107 to fuselage 110. In other implementations, less than all of motor arms 105 may extend from fuselage 110 and couple to ring wing 107.

In some implementations, aerial vehicle 110 may also include one or more stabilizer fins 120 that extend from fuselage 110 to ring wing 107. Stabilizer fin 120 may also have an airfoil shape. In the illustrated example, stabilizer fin 120 extends vertically from fuselage 110 to ring wing 107. In other implementations, stabilizer fin 120 may be disposed at other positions. For example, stabilizer fin 120 may extend downward from the fuselage between motor arm 105-1 and motor arm 105-6.

According to exemplary embodiments of the present disclosure, fuselage 110, motor arms 105, stabilizer fin 120, and ring wing 107 of aerial vehicle 100 may be formed of any one or more suitable materials, such as graphite, carbon fiber, and/or aluminum.

Each of propulsion mechanisms 102 is coupled to a respective motor arm 105 such that propulsion mechanism 102 is substantially contained within the perimeter of ring wing 107. For example, propulsion mechanism 102-1 can be coupled to motor arm 105-1, propulsion mechanism 102-2 can be coupled to motor arm 105-2, propulsion mechanism 102-3 can be coupled to motor arm 105-3, propulsion mechanism 102-4 can be coupled to motor arm 105-4, propulsion mechanism 102-5 can be coupled to motor arm 105-5, and propulsion mechanism 102-6 can be coupled to motor arm 105-6. In the illustrated example, each propulsion mechanism 102-1, 102-3, 102-4, and 102-6 can be coupled at an approximate mid-point of the respective motor arm 105-1, 105-3, 105-4, and 105-6 between fuselage 110 and ring wing 107. In comparison, propulsion mechanisms 102-2 and 102-5 can be coupled toward an end of the respective motor arms 105-2 and 105-5. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward fuselage 110 or closer toward ring wing 107).

As illustrated, propulsion mechanisms 102 may be oriented at different angles with respect to each other. For example, propulsion mechanisms 102-2 and 102-5 can be aligned with fuselage 110 such that the force generated by each of propulsion mechanisms 102-2 and 102-5 is in-line or in the same direction or orientation as the fuselage. In the illustrated example, aerial vehicle 100 is oriented for high-speed, fixed-wing, wing-borne, horizontal flight such that the fuselage is oriented horizontally in the direction of travel. In such an orientation, propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of fuselage 110. Accordingly, when aerial vehicle 100 is oriented horizontally as shown in FIG. 1C for horizontal flight, propulsion mechanisms 102-1, 102-3, 102-4, and 102-6 may be used as propulsion mechanisms, providing thrust in a non-horizontal direction to cause the aerial vehicle to pitch, yaw, roll, heave and/or sway. In other implementations, during horizontal flight, propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by the thrusting propulsion mechanisms 102-2 and 102-5.

In some implementations, one or more segments of ring wing 107 may include ailerons 109 that may be adjusted to control the aerial flight of aerial vehicle 100. For example, one or more ailerons 109 may be included on 1 upper segment 107-1 of ring wing 107 and/or one or more ailerons 109 may be included on side segments 107-4 and/or 107-3. Ailerons 109 may be operable to control the pitch, yaw, and/or roll of the aerial vehicle during high-speed, fixed-wing, wing-borne, horizontal flight when aerial vehicle 100 is oriented as illustrated in FIG. 1C.

The angle of orientation of each of the propulsion mechanisms 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102—may each be the same, with some oriented in one direction and some oriented in another direction, may each be oriented different amounts, and/or in different directions.

In the illustrated example of FIG. 1A, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of propulsion mechanisms 102-1, 102-2, 102-3, 102-4, 102-5, and 102-6 is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about third motor arm 105-2 and oriented toward propulsion mechanism 102-3. Finally, propulsion mechanism 102-4 is oriented approximately thirty degrees in the first direction about fourth motor arm 105-4 and toward propulsion 102-5. As illustrated, propulsion mechanisms 102-3 and 102-6, which are on opposing sides of fuselage 110, are aligned and oriented in a same first direction (in this example, horizontal). Propulsion mechanisms 102-2 and 102-5, which are on opposing sides of fuselage 110, are aligned and oriented in a same second direction, which is angled compared to the first direction. Propulsion mechanisms 102-1 and 102-4, which are on opposing sides of fuselage 110, are aligned and oriented in a same third direction, which is angled compared to the first direction and the second direction.

The unique design features of aerial vehicle 100 contribute to certain aerodynamic characteristics exhibited by aerial vehicle 100. For example, the configuration of ring wing 107, the angular orientations of propulsion mechanisms 102, and the canted orientation of fuselage 110 result in certain asymmetries associated with aerial vehicle 100 that produce certain flight characteristics, particularly in low-speed, VTOL/hover flight. In normal low-speed, VTOL/hover flight, aerial vehicle 100 exhibits more favorable aerodynamic conditions (e.g., milder attitudes, lower power consumption, etc.) with a vehicle orientation relative to the wind direction blowing from the front of aerial vehicle 100. However, under failure conditions associated with one or more of propulsion mechanisms 102 during low-speed, VTOL/hover flight, more favorable aerodynamic characteristics may be achieved with differing vehicle orientations relative to the wind direction based on which propulsion mechanism(s) 102 may be experiencing a failure condition. Further, the angled orientation of propulsion mechanism 102 can produce horizontal forces during VTOL/hover flight, which can lead to further instabilities under failure conditions. Under these failure conditions, aerial vehicle 100 may be vulnerable to certain orientations of aerial vehicle 100 relative to the wind direction, which can cause aerial vehicle 100 to exhibit degraded tracking performance and/or loss of control of the aircraft. Accordingly, the active weathervaning, according to exemplary embodiments of the present disclosure, can facilitate stable, reliable operation of aerial vehicle 100, even in certain failure conditions.

FIG. 1B illustrates a side view of the aerial vehicle 100 oriented for VTOL/hover flight, according to exemplary embodiments of the present disclosure. When oriented as illustrated in FIG. 1B, aerial vehicle 100 may maneuver in any of the six degrees of freedom (pitch, yaw, roll, heave, surge, and sway), thereby enabling VTOL/hover flight and high maneuverability.

As illustrated, when aerial vehicle 100 is oriented for VTOL/hover flight, the motor arms and ring wing 107 are aligned approximately horizontally and in the same plane. In this orientation, each of propulsion mechanisms 102 are offset or angled with respect to the horizontal and/or vertical direction. As such, each propulsion mechanism 102, when generating a force, generates a force that includes both a horizontal component and a vertical component. In the illustrated example, each propulsion mechanism 102 is angled approximately thirty degrees with respect to vertical. Likewise, as discussed above, adjacent propulsion mechanisms are angled in opposing directions to form pairs of propulsion mechanisms. For example, propulsion mechanism 102-2 is oriented toward propulsion mechanism 102-3. As discussed further below, angling adjacent propulsion mechanisms toward one another to form pairs of propulsion mechanisms allows horizontal forces from each propulsion mechanism to cancel out such that the pair of propulsion mechanisms can produce a vertical force. Likewise, if one of the propulsion mechanisms of a pair of propulsion mechanisms is producing a larger force than the other propulsion mechanism of the pair, a net horizontal force will result from the pair of propulsion mechanisms. Accordingly, when aerial vehicle 100 is oriented for VTOL/hover flight with angled propulsion mechanisms 102, as illustrated in FIG. 1B, aerial vehicle 100 can move independently in any of the six degrees of freedom.

To enable fuselage 110 to be oriented horizontally with an offset ring wing 107 during horizontal flight, as illustrated in FIG. 1C, fuselage 110 is rotated at an angle when aerial vehicle 100 is oriented for VTOL/hover flight, as illustrated in FIG. 1B. In this example fuselage 110 is angled at approximately thirty degrees from vertical. In other implementations, the amount of rotation from vertical may be greater or less depending on the amount of offset desired for ring wing 107 when aerial vehicle 100 is oriented for fixed-wing, wing-borne, horizontal flight.

Fuselage 110 may be used to store one or more components of aerial vehicle 100, such as an aerial vehicle control system, power module, and/or a payload that is transported by aerial vehicle 100. The aerial vehicle control system is discussed further below.

FIG. 1C is a side view of aerial vehicle 100 with ring wing 107, according to exemplary embodiments of the present disclosure.

As shown in FIG. 1C, aerial vehicle 100 is oriented for high-speed, horizontal, fixed-wing, wing-borne flight. When aerial vehicle 100 is oriented for horizontal flight, as illustrated in FIG. 1C, fuselage 110 is oriented horizontally and two of the propulsion mechanisms, propulsion mechanism 102-2 and propulsion mechanism 102-5 on the opposing side of the fuselage and illustrated in FIG. 1A, are oriented to produce thrust in a substantially horizontal direction. In comparison, the other propulsion mechanisms, such as propulsion mechanisms 102-1 and 102-3 are not oriented to produce forces in substantially the horizontal direction. During fixed-wing, wing-borne horizontal flight, the propulsion mechanisms, such as propulsion mechanism 102-1 and 102-3 may be disabled and/or used to produce maneuverability forces that will cause aerial vehicle 100 to pitch, yaw, and/or roll as it aerially navigates in a substantially horizontal direction.

Figure 2A:
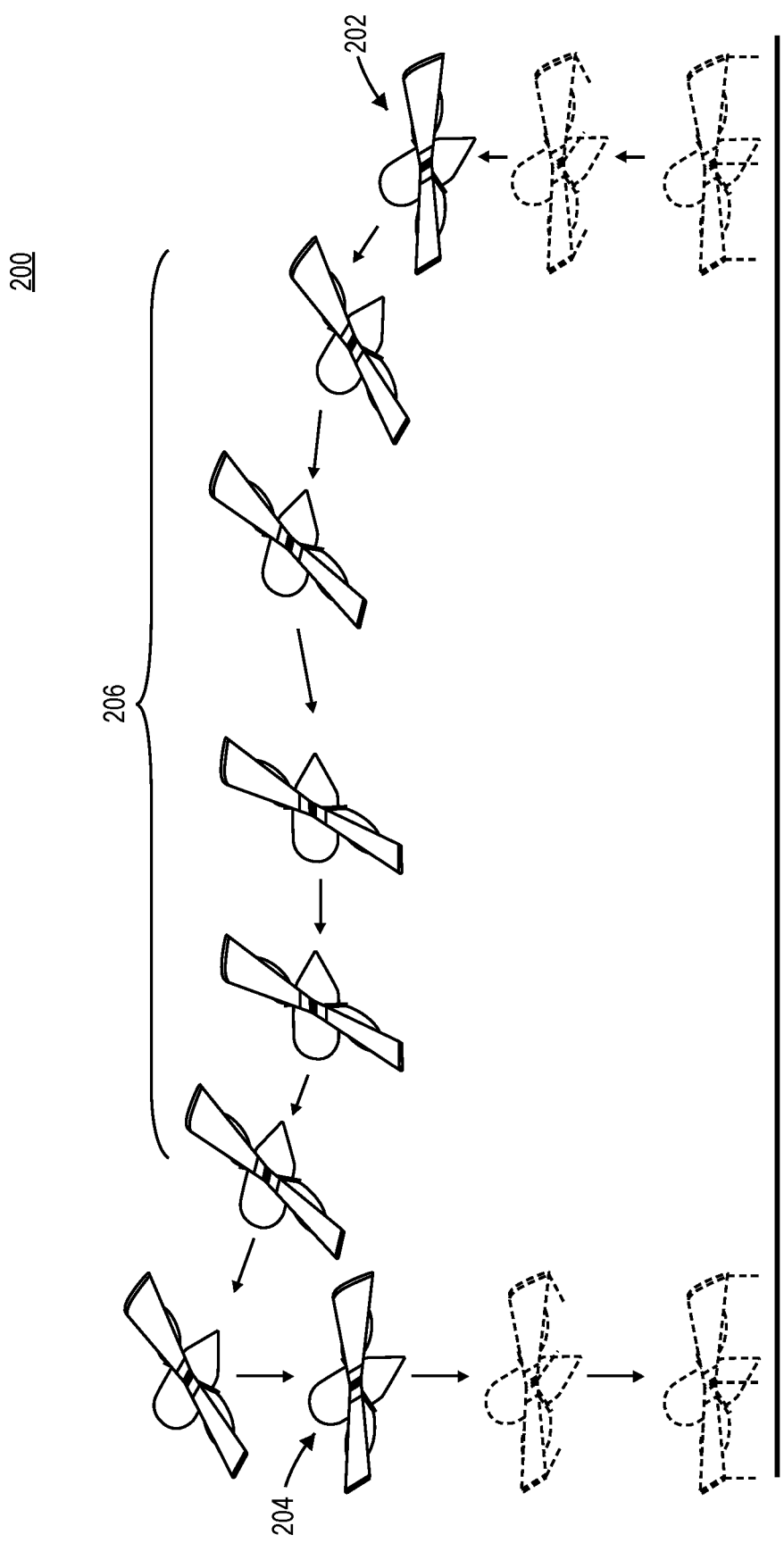
FIGS. 2A and 2B are illustrations of an exemplary flight of an aerial vehicle, according to exemplary embodiments of the present disclosure.
Figure 2B:
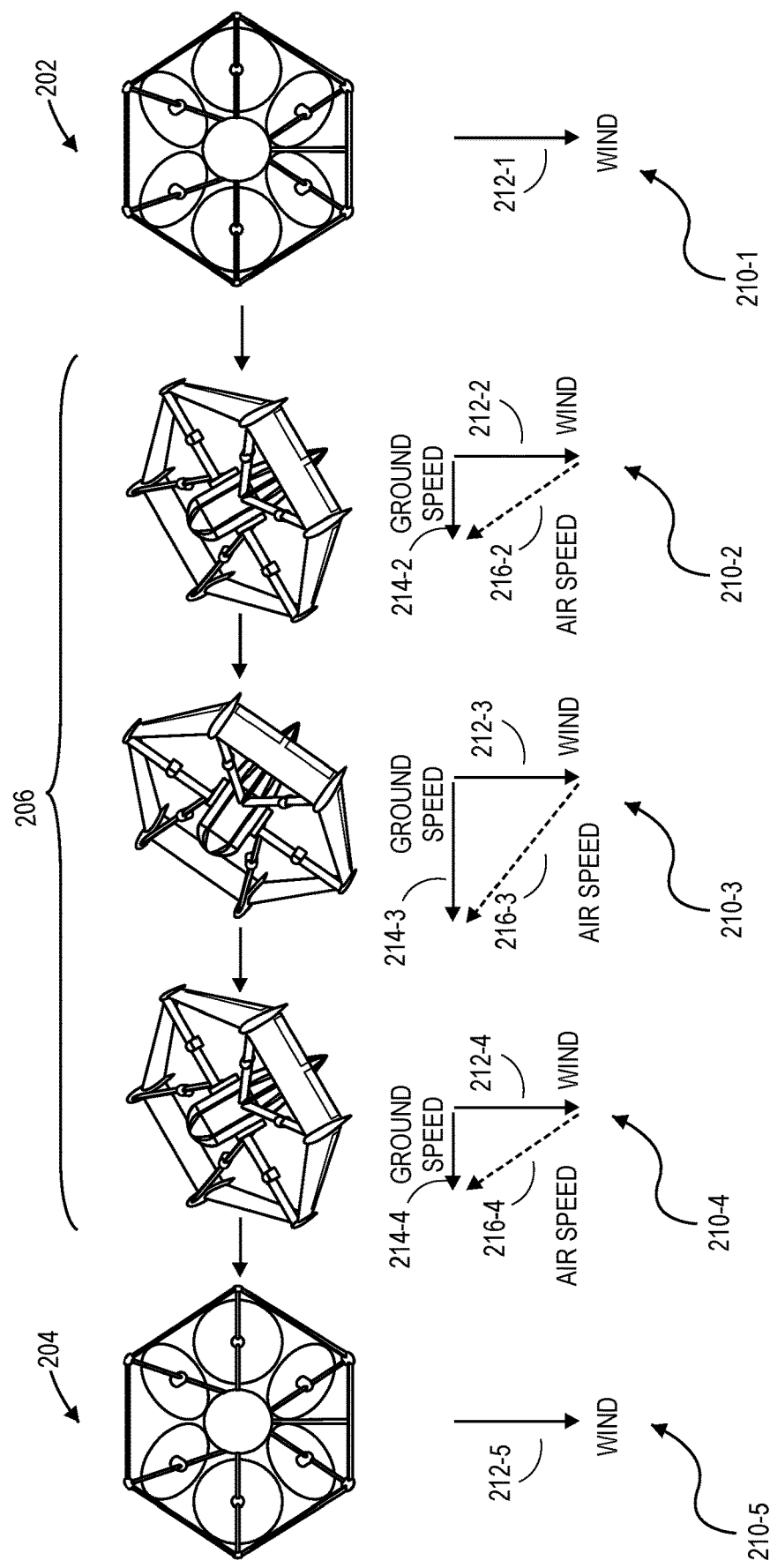

FIGS. 2A and 2B show an exemplary flight 200 of an exemplary aerial vehicle, according to exemplary embodiments of the present disclosure. FIG. 2A is an illustration of flight 200 from a side view, while FIG. 2B is an overhead illustration of flight 200.

As shown in FIG. 2A, the aerial vehicle may be configured to perform hybrid flight, i.e., low-speed, VTOL/hover flight 202 and 204 and high-speed, fixed-wing, wing-borne, horizontal flight 206. In the exemplary implementation shown in FIG. 2A, the aerial vehicle may be configured to perform active weathervaning without the assistance of an airspeed sensor during VTOL/hover flight 202 and 204 and may also be configured to perform active weathervaning between the transitions from VTOL/hover flight 202 and 204 and high-speed, fixed-wing, wing-borne, horizontal flight 206.

According to certain aspects of the present disclosure, the aerial vehicle shown in FIG. 2A may not employ low-speed wind sensors that are able to reliably measure airspeed during VTOL/hover flight 202 and 204 (e.g., at airspeeds below ~12 m/s). Accordingly, feedback flight control information associated with the aerial vehicle's VTOL/hover flight 202 and 204 may be used to determine a wind estimate (e.g., direction and magnitude). For example, feedback flight control information may be obtained from the horizontal integrators of the flight controller, which relate to parameters applied by the flight controller to counteract the forces that the wind may impart on the aerial vehicle (e.g., to maintain stable VTOL/hover flight and/or minimize tracking error, etc.). This feedback flight control information can be used to determine a wind estimate, which can include an estimated direction and magnitude, which may be utilized to actively steer and/or orient the aerial vehicle in the preferred orientation relative to the inferred wind estimate direction. Aspects of the present disclosure may also employ hysteresis logic to determine a threshold value where active weathervaning may be disabled. For example, when it is determined that the magnitude of the wind estimate is under the determined threshold value (e.g., less than 1 m/s, 2 m/s, 3 m/s, or any other wind speed), active weathervaning may be disabled so as to avoid repeated changes and/or large changes to the orientation/heading of the aerial vehicle in poorly defined wind conditions.

Additionally, according to embodiments of the present disclosure, the preferred orientation relative to the wind direction can also be determined. Although in normal VTOL/hover flight it may be preferable to orient the vehicle relative to the wind direction such that the wind is hitting the aerial vehicle from the front, given the design of the aerial vehicle (e.g., positioning and orientation of the propulsion mechanisms, positioning and orientation of the fuselage, positioning and orientation of the ring wing, etc.), the preferred orientation relative to the wind may change under certain failure conditions. Based on the failure conditions of the propulsion mechanisms, the preferred orientation relative to the wind direction may be at an offset angle on the side of the aerial vehicle experiencing the failure condition. Accordingly, when experiencing a failure condition, the failure condition may be identified so that the preferred relative wind direction may be determined, and the aerial vehicle may be actively oriented (e.g., using the propulsion mechanisms to control one or more of yaw, pitch, roll, horizontal forces, vertical forces, etc.).

In addition to determining the preferred relative wind direction, a vulnerable orientation relative to the wind may also be determined in view of the failure condition. This can include, for example, a relative wind direction which may present aerodynamic challenges to the aerial vehicle. Accordingly, in actively orienting the aerial vehicle to achieve the preferred orientation relative to the wind, the vulnerable orientation may be avoided (e.g., turning in a direction such that the aerial vehicle does not pass through the vulnerable orientation). For example, if it is determined that turning counterclockwise to achieve the preferred relative orientation would cause the aerial vehicle to pass through the vulnerable orientation, the aerial vehicle may be turned in the clockwise direction to achieve the preferred relative orientation, even in circumstances where rotating clockwise would be the longer turning direction.

In addition to performing active weathervaning during low-speed, VTOL/hover flight 202 and 204, aspects of the present disclosure facilitate active weathervaning during the transitions between low-speed, VTOL/hover flight 202 and 204 and high-speed, fixed-wing, wing-borne, horizontal flight 206.

According to exemplary embodiments of the present disclosure, as the aerial vehicle is preparing to transition from low-speed, VTOL/hover flight 202 to high-speed, fixed-wing, wing-borne, horizontal flight 206, a wind estimate (e.g., direction and magnitude) may be determined while the aerial vehicle is still in low-speed, VTOL/hover flight 202. The inferred wind estimate may be latched prior to entering the transition to high-speed, fixed-wing, wing-borne, horizontal flight 206. The wind estimate (e.g., direction and magnitude) may be combined with the ground speed of the aerial vehicle to determine an inferred airspeed of the aerial vehicle, which can be used to compute a heading (e.g., in the preferred relative orientation) and a command may be generated to change the heading of the aerial vehicle to actively orient the aerial vehicle in accordance with the computed heading. The inferred airspeed in view of the latched wind estimate and the ground speed may be variable through the transition as the aerial vehicle increases its airspeed to enter the transition from low-speed, VTOL/hover flight 202 to high-speed, fixed-wing, horizontal flight 206. Once the aerial vehicle has transitioned to high-speed, fixed-wing, wing-borne, horizontal flight 206, the wind estimate is unlatched, and a wind estimate (e.g., direction and magnitude) may be determined based on information received from a plurality of sensors (e.g., Kiel probes, pitot tubes, global positioning system sensors, and the like).

Additionally, exemplary embodiments of the present disclosure can also facilitate weathervaning of the aerial vehicle as it transitions from high-speed, fixed-wing, wing-borne, horizontal flight 206 to low-speed, VTOL/hover flight 204. In exemplary implementations, the latest wind estimate determined during high-speed, fixed-wing, wing-borne, horizontal flight 206 can be latched prior to entering the transition from high-speed, fixed-wing, wing-borne, horizontal flight 206 to low-speed, VTOL/hover flight 204. The latched wind estimate can be combined with the ground speed of the aerial vehicle to determine an inferred airspeed of the aerial vehicle, which can be used to compute a heading (e.g., in the preferred relative orientation) during the transition to low-speed, VTOL/hover flight 204 and during a buffer period after the transition has been completed. The buffer period may allow the feedback flight control information generated by the flight controller (e.g., the horizontal integrators) to stabilize before utilizing the feedback flight control information to infer a wind direction and magnitude for active weathervaning in low-speed, VTOL/hover flight 204. For example, transients introduced by the transition from high-speed, fixed-wing, wing-borne, horizontal flight 206 to low-speed, VTOL/hover flight 204 may cause the initial feedback flight control information to be unreliable in connection with providing active weathervaning to the aerial vehicle.

Similarly, FIG. 2B illustrates the aerial vehicle performing hybrid flight, i.e., low-speed, VTOL/hover flight 202 and 204 and high-speed, fixed-wing, wing-borne, horizontal flight 206 from an overhead view, with accompanying exemplary vector diagrams 210-1, 210-2, 210-3, 210-4, and 210-5.

In the exemplary implementation shown in FIG. 2B, the aerial vehicle may be configured to perform active weathervaning without the assistance of an airspeed sensor during VTOL/hover flight 202 and 204 and may also be configured to perform active weathervaning between the transitions from VTOL/hover flight 202 and 204 and high-speed, fixed-wing, wing-borne, horizontal flight 206.

According to certain aspects of the present disclosure, the aerial vehicle shown in FIG. 2B may not employ low-speed wind sensors that are able to reliably measure airspeed during VTOL/hover flight 202 and 204 (e.g., at airspeeds below ~12 m/s). Accordingly, feedback flight control information associated with the aerial vehicle's VTOL/hover flight 202 and 204 may be used to determine an estimated wind magnitude and direction, which can be used to determine an inferred airspeed. Inferred airspeed is typically the sum of the vectors of the ground speed vector and the wind vector. Accordingly, in VTOL/hover flight 202, where the aerial vehicle may be maintaining its position relative to the ground, the grounds speed of the aerial vehicle may be substantially close to zero. Accordingly, as shown in FIG. 2B, the inferred airspeed may effectively be reduced to wind vector 212-1. In this state, feedback flight control information may be obtained from the horizontal integrators of the flight controller, which relate to parameters applied by the flight controller to counteract the forces that the wind may impart on the aerial vehicle (e.g., to maintain stable VTOL/hover flight and/or minimize tracking error, etc.). This feedback flight control information can be used to determine the wind estimate, which may be utilized to actively steer and/or orient the aerial vehicle in the preferred orientation relative to the wind estimate direction. Aspects of the present disclosure may also employ hysteresis logic to determine a threshold value where active weathervaning may be disabled. For example, when it is determined that the magnitude of the wind is under the determined threshold value (e.g., less than 1 m/s, 2 m/s, 3 m/s, or any other wind speed), active weathervaning may be disabled so as to avoid repeated changes and/or large changes to the orientation/heading of the aerial vehicle in poorly defined wind conditions.

Additionally, according to embodiments of the present disclosure, the preferred orientation relative to the wind direction can also be determined. Although in normal VTOL/hover flight it may be preferable to orient the vehicle relative to the wind direction such that the wind is hitting the aerial vehicle from the front, given the design of the aerial vehicle (e.g., positioning and orientation of the propulsion mechanisms, positioning and orientation of the fuselage, positioning and orientation of the ring wing, etc.), the preferred orientation relative to the wind may change under certain failure conditions. Based on the failure conditions of the propulsion mechanisms, the preferred orientation relative to the wind direction may be at an offset angle on the side of the aerial vehicle experiencing the failure condition. Accordingly, when experiencing a failure condition, the failure condition may be identified so that the preferred relative wind direction may be determined, and the aerial vehicle may be actively oriented (e.g., using the propulsion mechanisms to control one or more of yaw, pitch, roll, horizontal forces, vertical forces, etc.).

In addition to determining the preferred relative wind direction, a vulnerable orientation relative to the wind may also be determined in view of the failure condition. This can include, for example, a relative wind direction which may present aerodynamic challenges to the aerial vehicle. Accordingly, in actively orienting the aerial vehicle to achieve the preferred orientation relative to the wind, the vulnerable orientation may be avoided (e.g., turning in a direction such that the aerial vehicle does not pass through the vulnerable orientation). For example, if it is determined that turning counterclockwise to achieve the preferred relative orientation would cause the aerial vehicle to pass through the vulnerable orientation, the aerial vehicle may be turned in the clockwise direction to achieve the preferred relative orientation, even in circumstances where rotating clockwise would be the longer turning direction.

In addition to performing active weathervaning during low-speed, VTOL/hover flight 202 and 204, aspects of the present disclosure facilitate active weathervaning during the transitions between low-speed, VTOL/hover flight 202 and 204 and high-speed, fixed-wing, wing-borne, horizontal flight 206.

According to exemplary embodiments of the present disclosure, as the aerial vehicle is preparing to transition from low-speed, VTOL/hover flight 202 to high-speed, fixed-wing, wing-borne, horizontal flight 206, an estimated wind direction and magnitude may be determined while the aerial vehicle is still in low-speed, VTOL/hover flight 202. The estimated wind estimate may be latched prior to entering the transition to high-speed, fixed-wing, wing-borne, horizontal flight 206. The wind estimate may be used to compute a heading (e.g., in the preferred relative orientation) and a command may be generated to change the heading of the aerial vehicle to actively orient the aerial vehicle in accordance with the computed heading. The latched wind estimate may be combined with the vehicle's ground speed to determine an inferred airspeed, which can be used during the as the aerial vehicle increases its airspeed to enter the transition from low-speed, VTOL/hover flight 202 to high-speed, fixed-wing, horizontal flight 206.

Accordingly, as the aerial vehicle transitions from low-speed, VTOL/hover flight to high-speed, fixed-wing, wing-borne, horizontal flight, the aerial vehicle may orient itself from an orientation for low-speed, VTOL/hover flight (e.g., where the fuselage is in a substantially vertical orientation) to an orientation for high-speed, fixed-wing, wing-borne, horizontal flight (e.g., where the fuselage is in a substantially horizontal orientation). As the orientation of the vehicle is transitioning from low-speed, VTOL/hover flight to high-speed, fixed-wing, wing-borne, horizontal flight, the aerial vehicle will experience an increase in ground speed. As shown in FIG. 2B, ground speed vector 214-2 may be aggregated (e.g., via vector addition) with wind vector 212-2 to determine inferred airspeed vector 216-2. Accordingly, the aerial vehicle may adjust its heading based on inferred airspeed vector 216-2.

Further, inferred airspeed vector 216 of the aerial vehicle during the transition may change as a function of ground speed during the transition from low-speed, VTOL/hover flight to high-speed, fixed-wing, wing-borne, horizontal flight (e.g., as the aerial vehicle experiences an increase in ground speed, the inferred airspeed, which is determined based on vector addition of the latched inferred airspeed and the ground speed, will change). As shown in FIG. 2B, as ground speed vector 214-3 increases in magnitude (relative to ground speed vector 214-2), the aggregation of ground speed vector 214-3 and wind vector 212-3 may yield a different airspeed vector 216-3. Accordingly, the heading of the aerial vehicle may be continuously adjusted based on the change in airspeed vector 216 during the transition. Further, during the transition, the wind magnitude may be determined using a table that correlates the feedback information provided by the horizontal integrator, an air density estimation, and the wind magnitude.

Once the aerial vehicle has transitioned to high-speed, fixed-wing, wing-borne, horizontal flight 206, the wind estimate is unlatched, and the wind direction and magnitude may be determined based on information received from a plurality of sensors (e.g., Kiel probes, pitot tubes, global positioning system sensors, and the like).

Additionally, exemplary embodiments of the present disclosure can also facilitate weathervaning of the aerial vehicle as it transitions from high-speed, fixed-wing, wing-borne, horizontal flight 206 to low-speed, VTOL/hover flight 204. In exemplary implementations, the latest wind estimate determined during high-speed, fixed-wing, wing-borne, horizontal flight 206 can be latched prior to entering the transition from high-speed, fixed-wing, wing-borne, horizontal flight 206 to low-speed, VTOL/hover flight 204. The latched wind estimate can be combined with the vehicle's ground speed to determine an inferred airspeed, which can be used during the transition to low-speed, VTOL/hover flight 204 and during a buffer period after the transition has been completed. The buffer period may allow the feedback flight control information generated by the flight controller (e.g., the horizontal integrators) to stabilize before utilizing the feedback flight control information to infer a wind direction and magnitude for active weathervaning in low-speed, VTOL/hover flight 204. For example, transients introduced by the transition from high-speed, fixed-wing, wing-borne, horizontal flight 206 to low-speed, VTOL/hover flight 204 may cause the initial feedback flight control information to be unreliable in connection with providing active weathervaning to the aerial vehicle.

Accordingly, as the aerial vehicle transitions from high-speed, fixed-wing, wing-borne, horizontal flight 206 to low-speed, VTOL/hover flight 204, the aerial vehicle may orient itself from an orientation for high-speed, fixed-wing, wing-borne, horizontal flight 206 (e.g., where the fuselage is in a substantially horizontal orientation) to an orientation for low-speed, VTOL/hover flight 204 (e.g., where the fuselage is in a substantially vertical orientation). As the orientation of the vehicle is transitioning from high-speed, fixed-wing, wing-borne, horizontal flight 206 to low-speed, VTOL/ hover flight 204, the aerial vehicle will experience a decrease in ground speed. As shown in FIG. 2B, a magnitude of ground speed vector 214-4 may be less than a magnitude of ground speed vector 214-3. Accordingly, during the transition from high-speed, fixed-wing, wing-borne, horizontal flight 206 to low-speed, VTOL/hover flight 204, ground speed vector 214-4 may be aggregated (e.g., via vector addition) with wind vector 212-4 to determine inferred airspeed vector 216-4. Accordingly, the aerial vehicle may adjust its heading based on inferred airspeed vector 216-4, and the heading of the aerial vehicle may be continuously adjusted based on the change in airspeed vector 216 during the transition, until the aerial vehicle has achieved low-speed, VTOL/hover flight 204. As shown in FIG. 2B, during low-speed, VTOL/hover flight 204, ground speed may be effectively zero, such that the airspeed of the aerial vehicle is effectively represented by wind vector 212-5. Accordingly, the aerial vehicle may unlatch the wind estimate determined during high-speed, fixed-wing, wing-borne, horizontal flight 206, and may resume active weathervaning for VTOL/hover flight, as described herein in connection with VTOL/hover flight.

Figure 3A:
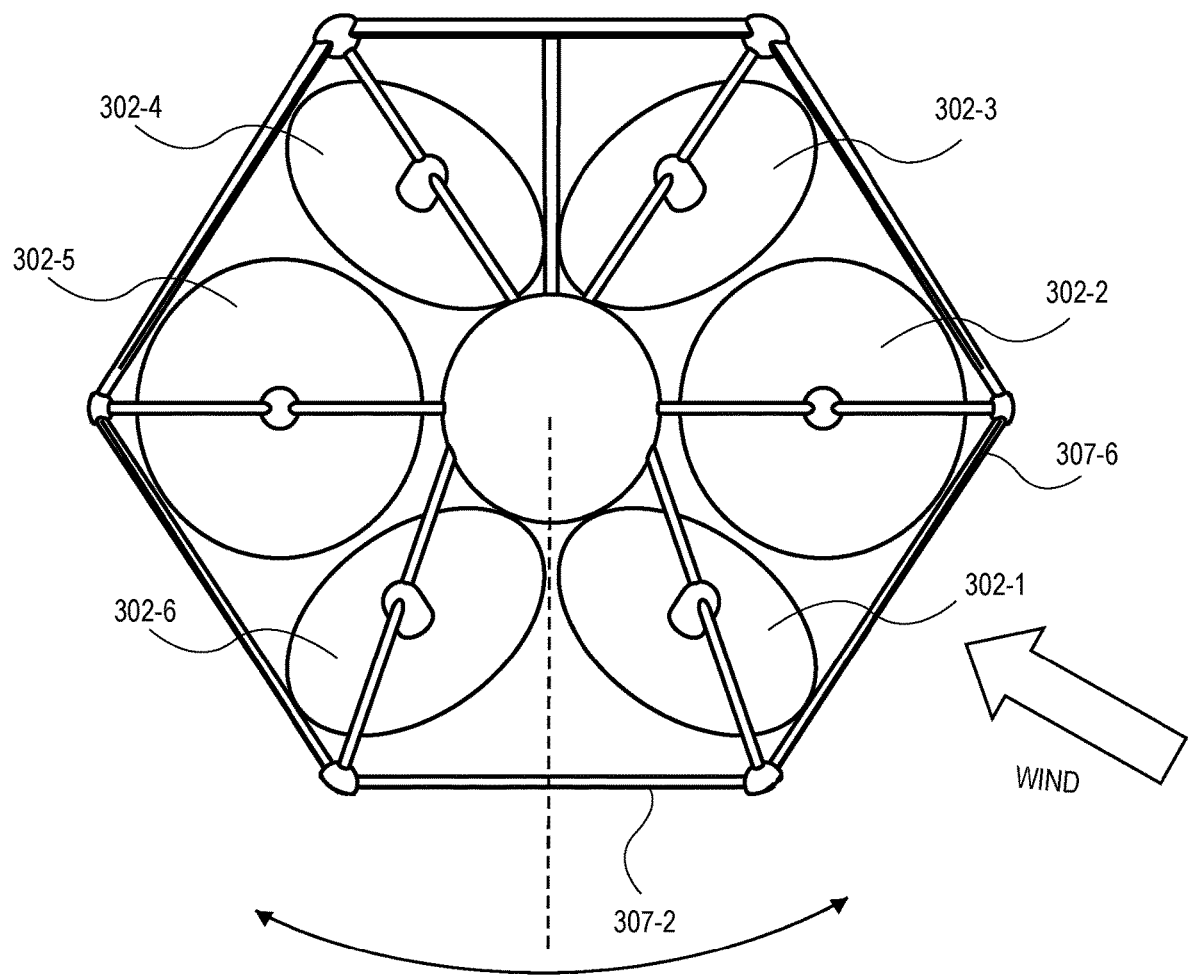
FIGS. 3A and 3B illustrate an overhead view of exemplary active weathervaning of an aerial vehicle, according to exemplary embodiments of the present disclosure.
Figure 3B:
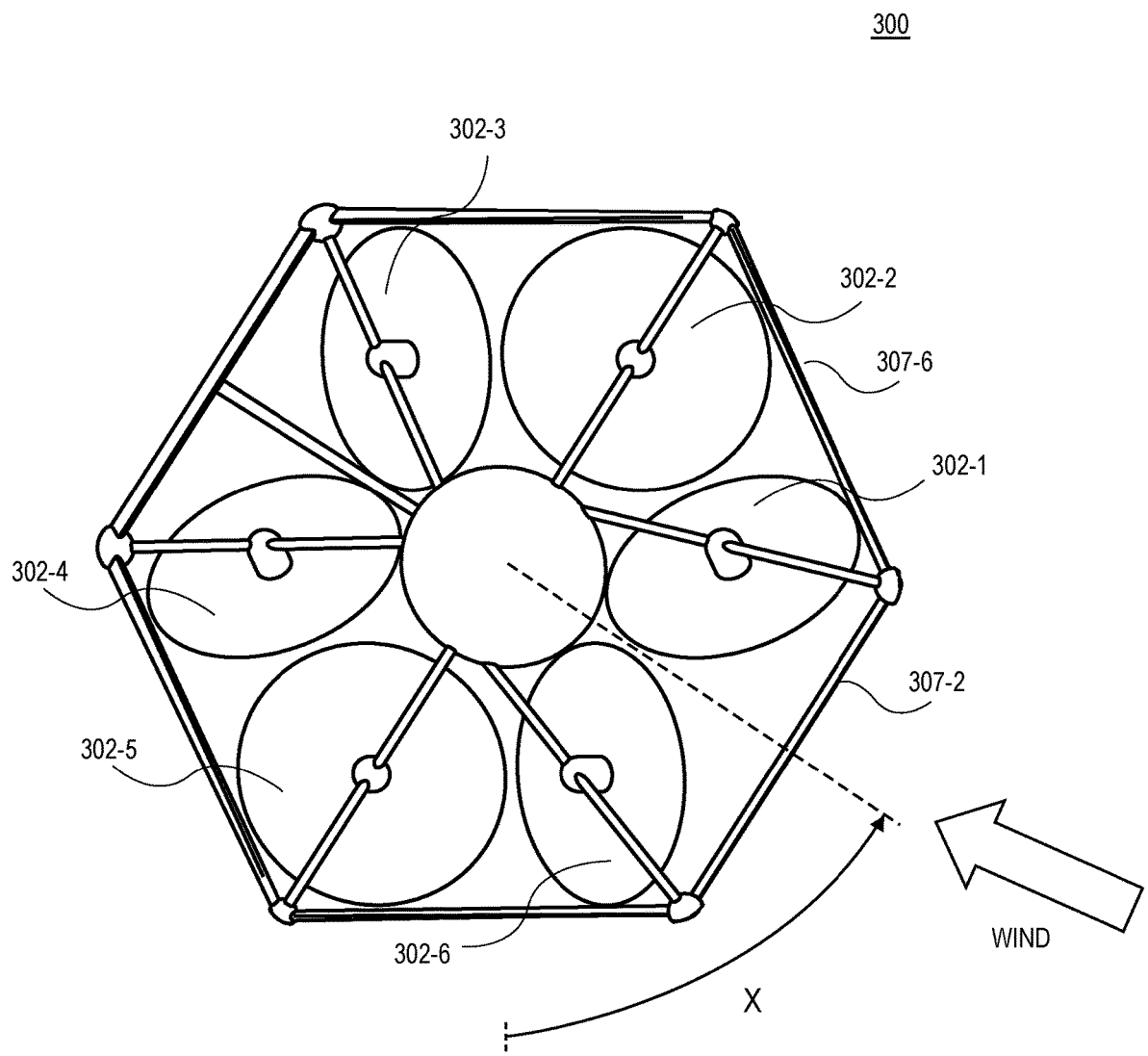

FIGS. 3A and 3B illustrate an overhead view of exemplary active weathervaning of aerial vehicle 300, according to exemplary embodiments of the present disclosure.

As shown in FIGS. 3A and 3B, aerial vehicle 300 may be performing low-speed, VTOL/hover flight. Further, aerial vehicle 300 may be experiencing normal operation without any failure conditions of any propulsion mechanisms, such that propulsion mechanisms 302-1, 302-2, 302-3, 302-4, 302-5, and 302-6 are all operating normally. Further, the wind may be blowing towards the left front side of the vehicle towards ring-wing segment 307-6.

In the exemplary implementation, aerial vehicle 300 may rely on feedback information from the flight controller to determine an estimated wind direction and magnitude. For example, the flight controller of the aerial vehicle 300 may include a horizontal integrator, which may be configured to accumulate the commands issued by the flight controller to counteract the prevailing wind conditions (e.g., in a direction opposite the wind's velocity vector) in an effort to minimize tracking errors while maintaining steady, low-speed, VTOL/hover flight. For example, the estimated wind direction may be inferred using the azimuth of one of the state vectors of the horizontal integrator.

Based on the wind magnitude, hysteresis logic may determine whether the wind magnitude is sufficiently large to enable active weathervaning. For example, when it is determined that the magnitude of the wind is under a threshold value (e.g., less than 1 m/s, 2 m/s, 3 m/s, or any other wind speed), active weathervaning may be disabled so as to avoid repeated changes and/or large changes to the orientation/ heading of the aerial vehicle in poorly defined wind conditions.

If it is determined that the wind magnitude exceeds the threshold value to activate active weathervaning, a preferred relative orientation of aerial vehicle 300 relative to the wind direction may be determined. The preferred relative orientation of aerial vehicle 300 may be based on the operating conditions of aerial vehicle 300 (e.g., existence of any failure conditions, etc.). In the example implementation shown in FIGS. 3A and 3B where aerial vehicle 300 is operating under normal operating conditions (e.g., no failure conditions-propulsion mechanisms 302-1, 302-2, 302-3, 302-4, 302-5, and 302-6 are all operating normally), it may be determined that the preferred relative orientation of aerial vehicle 300 is facing the wind (e.g., having the wind hit the vehicle from the front towards ring-wing segment 307-2).

Accordingly, to achieve the preferred relative orientation, it may be determined that aerial vehicle 300 should be rotated approximately 60° in a counterclockwise direction, as designated by X in FIG. 3B (or 300° in a clockwise direction). Additionally, aerial vehicle 300 may determine whether any vulnerable orientations exist in either path of rotation. Assuming that no vulnerable orientations exist in either path of rotation, based on the wind direction and the preferred relative orientation, the flight controller of aerial vehicle 300 may actively instruct a heading change so as to rotate aerial vehicle 300 in a counterclockwise direction, as designated by X in FIG. 3B, by approximately 60° from the orientation shown in FIG. 3A to the orientation shown in FIG. 3B. Further, aerial vehicle 300 may continuously monitor any failure conditions associated with the operation of the vehicle, determine a wind direction and magnitude during flight, determine a preferred relative orientation to the wind, and actively orient vehicle 300 in the preferred relative orientation to the wind during low-speed, VTOL/hover flight.

Figure 4A:
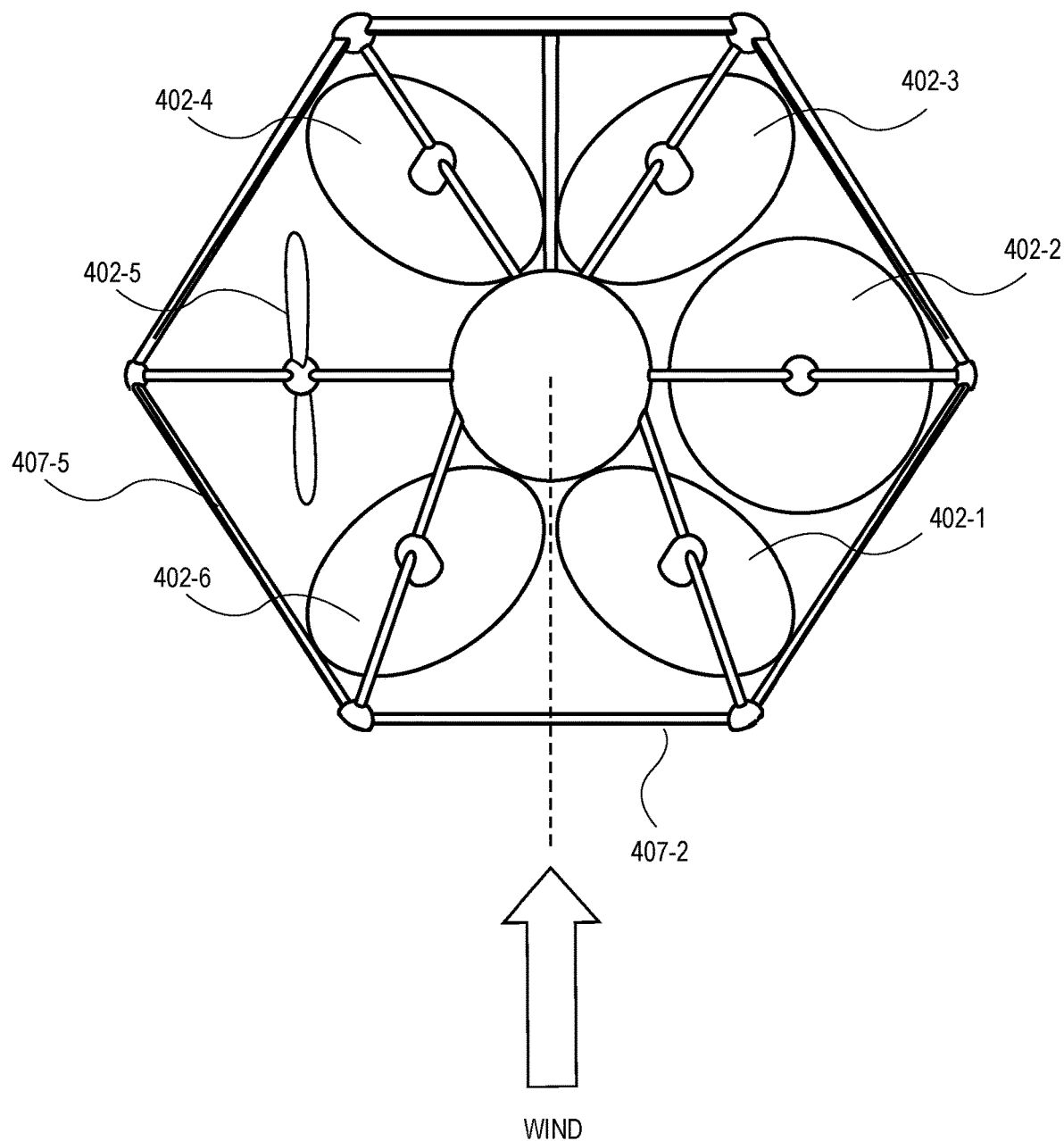
FIGS. 4A and 4B illustrate an overhead view of exemplary active weathervaning of an aerial vehicle experiencing a failure condition, according to exemplary embodiments of the present disclosure.
Figure 4B:
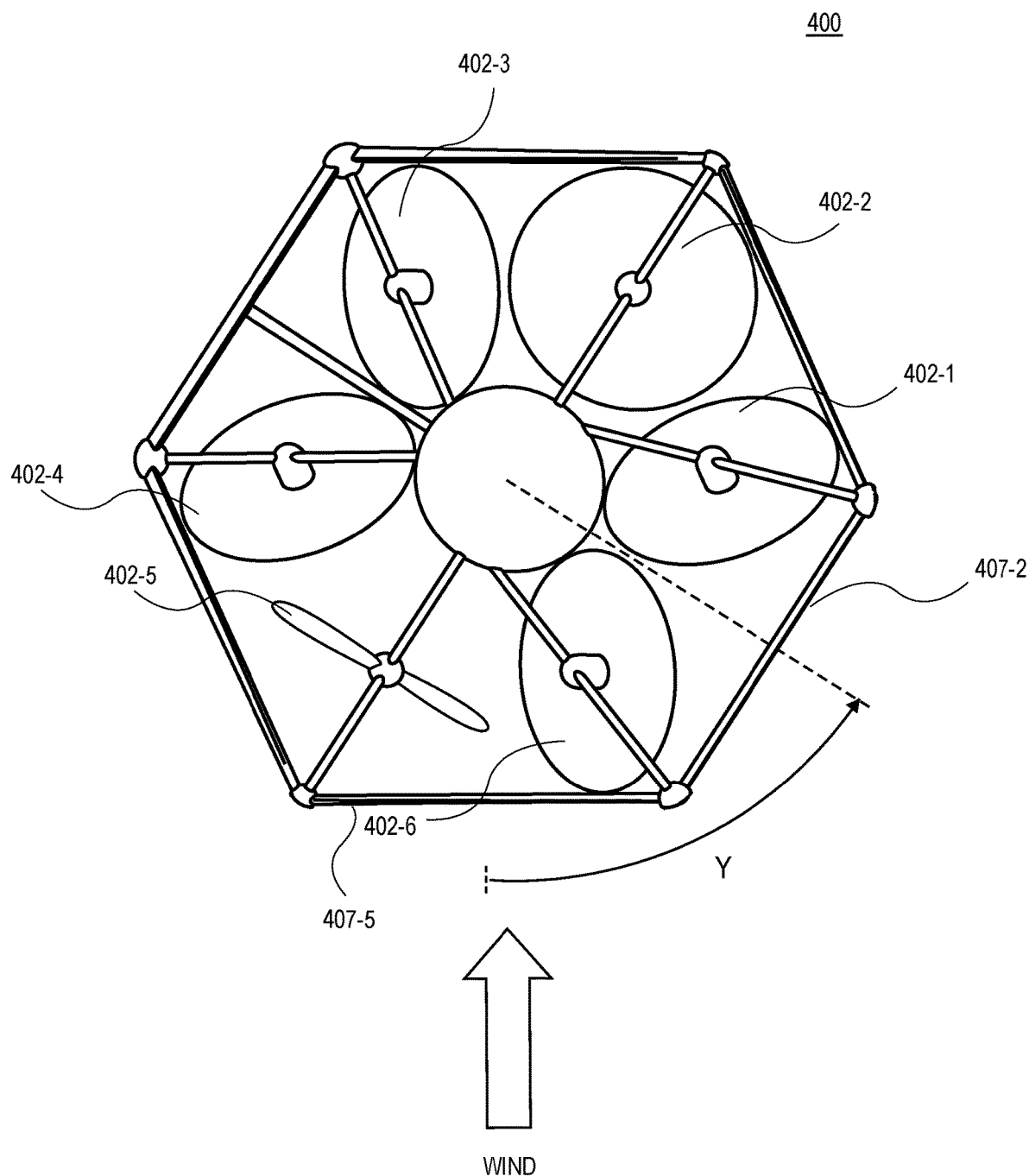

FIGS. 4A and 4B illustrate an overhead view of exemplary active weathervaning of aerial vehicle 400 experiencing a failure condition, according to exemplary embodiments of the present disclosure.

Similar to the exemplary implementation shown in FIGS. 3A and 3B, as shown in FIGS. 4A and 4B, aerial vehicle 400 may be performing low-speed, VTOL/hover flight. However, unlike, the exemplary implementation shown in FIGS. 3A and 3B, aerial vehicle 400 may be experiencing a failure condition where propulsion mechanism 402-5 is not operating normally. Further, the wind may be blowing towards the front side of the vehicle towards ring-wing segment 407-2.

In the exemplary implementation, aerial vehicle 400 may identify the failure condition that it is experiencing and determine a preferred relative orientation to the wind based on the failure condition it is experiencing, i.e., failure of propulsion mechanism 402-5. Based on the identified failure condition, aerial vehicle 400 may have a preferred relative orientation to the wind. In the implementation where aerial vehicle 400 is experiencing a failure condition, the preferred relative orientation may be where the wind is blowing toward the right, front side of aerial vehicle toward ring-wing segment 407-5. Further, aerial vehicle 400 may have a different preferred relative orientation if aerial vehicle 400 was experiencing a failure of propulsion mechanisms 402-5 and 402-1, and yet another different preferred relative orientation if aerial vehicle 400 was experiencing a failure of propulsion mechanism 402-3, etc. Accordingly, there may be a particular preferred relative orientation of aerial vehicle 400 for every combination of propulsion mechanism failure conditions.

In addition to identifying the failure condition to determine the preferred relative orientation of aerial vehicle 400, the flight controller of aerial vehicle 400 may rely on feedback information from the flight controller to determine an estimated wind direction and magnitude. For example, the flight controller of the aerial vehicle 400 may include a horizontal integrator, which may be configured to accumulate the commands issued by the flight controller to counteract the prevailing wind conditions (e.g., in a direction opposite the wind's velocity vector) in an effort to minimize tracking errors while maintaining steady, low-speed, VTOL/hover flight. For example, the estimated wind direction may be inferred using the azimuth of one of the state vectors of the horizontal integrator.

Based on the wind magnitude, hysteresis logic may determine whether the wind magnitude is sufficiently large to enable active weathervaning. For example, when it is determined that the magnitude of the wind is under a threshold value (e.g., less than 1 m/s, 2 m/s, 3 m/s, or any other wind speed), active weathervaning may be disabled so as to avoid repeated changes and/or large changes to the orientation/heading of the aerial vehicle in poorly defined wind conditions.

If it is determined that the wind magnitude exceeds the threshold value to activate active weathervaning, the flight controller of aerial vehicle 400 may issue commands to actively change the heading of aerial vehicle 400 to position and orient aerial vehicle 400 in the preferred relative orientation. Accordingly, to achieve the preferred relative orientation, it may be determined that aerial vehicle 400 should be rotated approximately 60° in a counterclockwise direction, as designated by Y in FIG. 4B (or 300° in a clockwise direction). Additionally, aerial vehicle 400 may determine whether any vulnerable orientations exist in either path of rotation.

Assuming that no vulnerable orientations exist in either path of rotation, based on the wind direction and the preferred relative orientation, the flight controller of aerial vehicle 400 may actively instruct a heading change so as to rotate aerial vehicle 400 in a counterclockwise direction, as designated by Y in FIG. 4B, by approximately 60° from the orientation shown in FIG. 4A to the orientation shown in FIG. 4B. Further, aerial vehicle 400 may continue to monitor any failure conditions associated with the operation of the vehicle, determine a wind direction and magnitude during flight, determine a preferred relative orientation to the wind, and actively orient vehicle 400 in the preferred relative orientation to the wind during low-speed, VTOL/hover flight.

Figure 5:
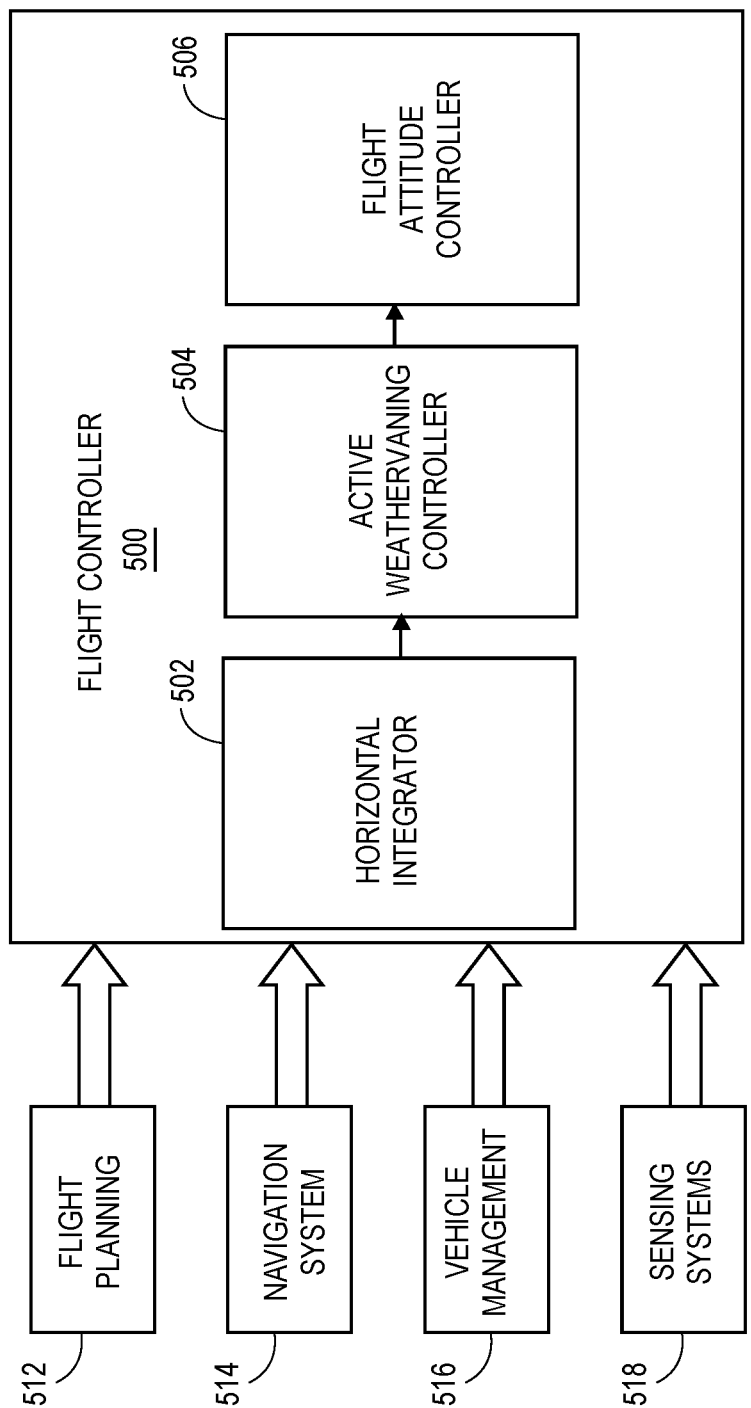
FIG. 5 is a block diagram of an exemplary flight controller, according to exemplary embodiments of the present disclosure.

FIG. 5 is a block diagram of an exemplary flight controller 500, according to exemplary embodiments of the present disclosure.

As shown in FIG. 5, flight controller 500 may include horizontal integrator 502, active weathervaning controller 504, and flight attitude controller 506. Further, flight controller 500 may obtain information from flight planning system 512, navigation system 514, vehicle management system 516, and sensing systems 518.

Sensing systems 518 may include a variety of sensors, such as a global positioning system (GPS) sensor, an inertial measurement unit (IMU), altimeter, speed sensors (e.g., Kiel probe, etc.), or other sensor systems that can facilitate navigation of the aerial vehicle, in conjunction with navigation system 514. Flight planning system 512 may be configured to plan a flight path in view of the mission being performed by the aerial vehicle, and vehicle management system 516 may be configured to control and manage the various systems and components of the aerial vehicle, such as the propulsion mechanisms, aerodynamic surfaces (e.g., ailerons, etc.), payload systems, power supply, etc.

As shown in FIG. 5, flight controller 500 may include horizontal integrator 502, active weathervaning controller 504, and flight attitude controller 506. Horizontal integrator 502 may be configured as a proportional-integral-derivative (PID) controller that responds to horizontal errors associated with the flight of the aerial vehicle. Flight controller 500 may also include a vertical integrator, which may also be configured as a PID controller that responds to vertical errors associated with the flight of the aerial vehicle.

In facilitating active weathervaning of the aerial vehicle, active weathervaning controller 504 determines the weathervaning state for the aerial vehicle. For example, active weathervaning controller 504 may select between four weathervaning states: (1) active weathervaning for low-speed, VTOL/hover flight; (2) latched wind estimate for transition to from low-speed, VTOL/hover flight to high-speed, fixed-wing, wing-borne, horizontal flight; (3) active weathervaning for high-speed, fixed wing, wing-borne, horizontal flight; and (4) latched wind estimate for transition from high-speed, fixed-wing, wing-borne, horizontal flight to low-speed, VTOL/hover flight.

The active weathervaning for low-speed, VTOL/hover flight state may be selected for low-speed, VTOL/hover flight for the aerial vehicle. Accordingly, in the active weathervaning for low-speed, VTOL/hover flight state, active weathervaning controller 504 may obtain feedback flight control information from horizontal integrator 502 of flight controller 500. The feedback flight control information may include flight commands issued for the horizontal direction that are applied to counteract the forces that may be imparted by the wind on the aerial vehicle (e.g., to maintain stable VTOL/hover flight and/or minimize tracking error, etc.). The estimated wind direction and/or magnitude may be provided to flight attitude controller 506, which may generate commands to actively orient the aerial vehicle in the preferred relative orientation to the wind.

As the aerial vehicle prepares to transition from low-speed, VTOL/hover flight to high-speed, fixed-wing, wing-borne, horizontal flight, active weathervaning controller 504 may select the latched wind estimate for transition from low-speed, VTOL/hover flight to high-speed, fixed-wing, wing-borne, horizontal flight state. In the latched wind estimate for transition from low-speed, VTOL/hover flight to high-speed, fixed-wing, wing-borne, horizontal flight state, active weathervaning controller 504 may latch the estimated wind direction and magnitude, which was determined in the active weathervaning for low-speed, VTOL/hover flight state. Once the estimated wind direction and magnitude is latched for the transition to high-speed, fixed-wing, wing-borne, horizontal flight, active weathervaning controller 504 may temporarily suspend further determinations of an estimated wind direction. The latched estimated wind direction and magnitude may be combined with the aerial vehicle's ground speed, which can be used to compute a heading (e.g., in the preferred relative orientation) and a command may be generated to actively orient the aerial vehicle in accordance with the computed heading The inferred airspeed may be updated as the aerial vehicle increases its airspeed to enter the transition from low-speed, VTOL/hover flight to high-speed, fixed-wing, wing-borne, horizontal flight.

Once the aerial vehicle has transitioned to high-speed, fixed-wing, wing-borne, horizontal flight, active weathervaning controller 504 may select the active weathervaning for high-speed, fixed wing, wing-borne, horizontal flight state. In the active weathervaning for high-speed, fixed wing, wing-borne, horizontal flight state, active weathervaning controller 504 may unlatch the estimated wind direction and magnitude, and the wind estimate (e.g., direction and magnitude) may be determined based on information received from a plurality of sensors (e.g., Kiel probes, pitot tubes, global positioning system sensors, and the like).

As the aerial vehicle prepares to transition from high-speed, fixed-wing, wing-borne, horizontal flight to low-speed, VTOL/hover flight, active weathervaning controller 504 may select the latched wind estimate for transition from high-speed, fixed-wing, wing-borne, horizontal flight to low-speed, VTOL/hover flight state. In the latched wind estimate for transition from high-speed, fixed-wing, wing-borne, horizontal flight to low-speed, VTOL/hover flight state, active weathervaning controller 504 may latch the latest wind estimate determined during high-speed, fixed-wing, wing-borne, horizontal flight prior to entering the transition from high-speed, fixed-wing, wing-borne, horizontal flight to low-speed, VTOL/hover flight. The latched wind estimate can be maintained through the transition to low-speed, VTOL/hover flight and during a buffer period after the transition has been completed. The buffer period may allow the feedback flight control information generated by the flight controller (e.g., the horizontal integrators) to stabilize before active weathervaning controller 504 selects the active weathervaning for low-speed, VTOL/hover flight state such that the feedback flight control information from horizontal integrator 502 may again be used to infer a wind direction and magnitude for active weathervaning in low-speed, VTOL/hover flight. For example, transients introduced by the transition from high-speed, fixed-wing, wing-borne, horizontal flight to low-speed, VTOL/hover flight may cause the initial feedback flight control information from horizontal integrator 502 to be unreliable in connection with providing active weathervaning to the aerial vehicle.

Figure 6:
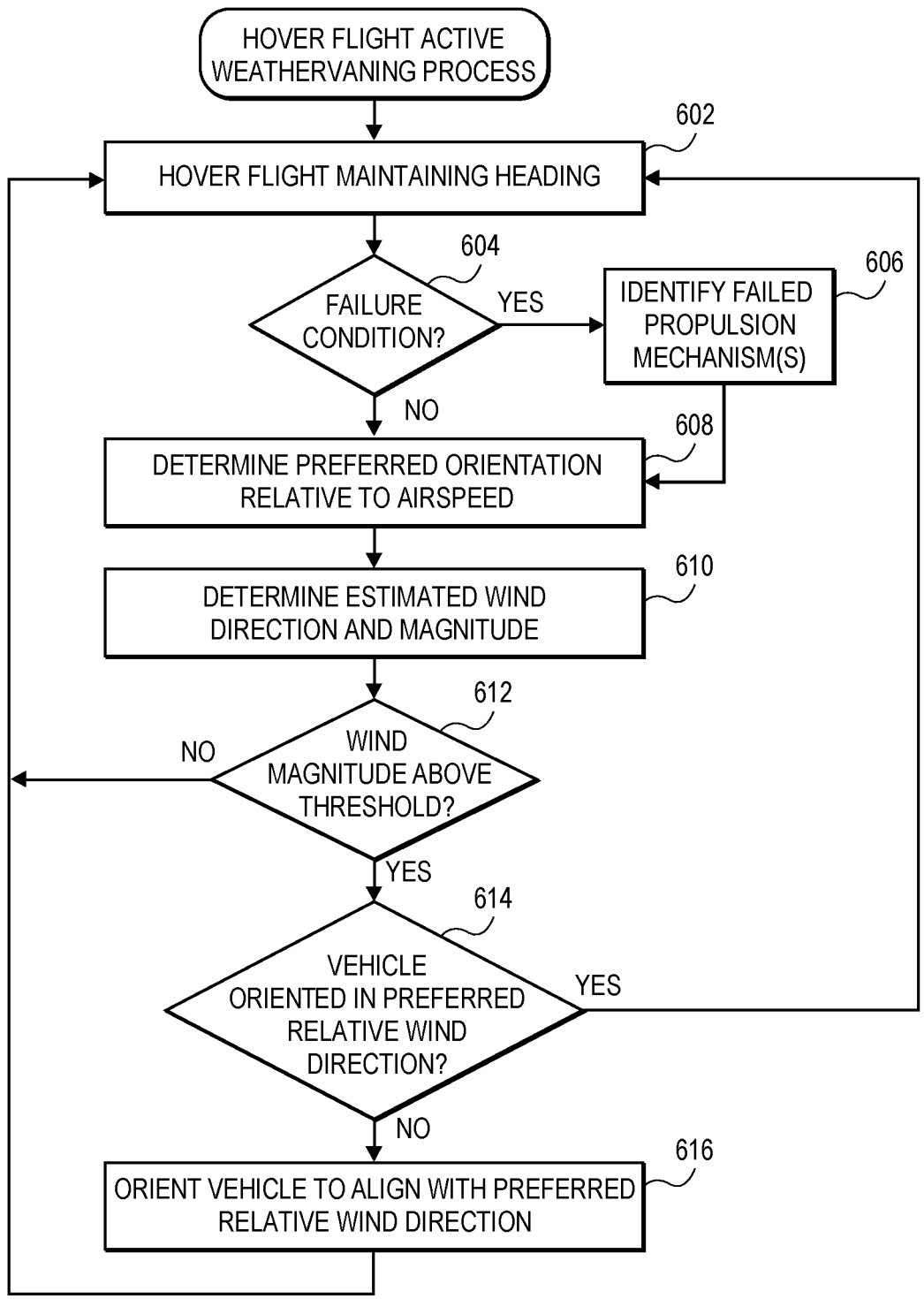
FIG. 6 is a flow diagram of an exemplary hover flight active weathervaning process, according to exemplary embodiments of the present disclosure.

FIG. 6 is a flow diagram of an exemplary hover flight active weathervaning process 600, according to exemplary embodiments of the present disclosure. Process 600 may be performed by an aerial vehicle, such as aerial vehicle 100, during low-speed, VTOL/hover flight.

As shown in FIG. 6, process 600 may begin with the aerial vehicle performing low-speed, VTOL/hover flight while maintaining a preferred heading, as in step 602. This may be performed, for example, by an aerial vehicle that is capable of hybrid flight (e.g., both low-speed, VTOL/hover flight and high-speed, fixed-wing, wing-borne, horizontal flight), such as aerial vehicle 100.

In step 604, it can be determined whether the aerial vehicle is experiencing a failure condition. This can include a failure of one or more propulsion mechanism(s). In the event that a failure condition is detected, the failed propulsion mechanism(s) can be identified, as in step 606. Next, in step 608, the preferred orientation of the aerial vehicle relative to the wind direction can be determined. For example, the preferred orientation can be determined based on whether a failure condition exists, as determined in step 604, and an identification of the failure conditions, as performed in step 606. According to aspects of the present disclosure, the aerial vehicle may have a specific preferred relative orientation to the wind direction based on whether a failure condition exists and for each combination of propulsion mechanism failure conditions.

In addition to determining the preferred relative orientation of the aerial vehicle, an estimated wind direction and magnitude may be determined, as in step 610. According to exemplary embodiments of the present disclosure, the aerial vehicle may obtain feedback flight control information from a horizontal integrator of a flight controller. The feedback flight control information may include flight commands issued for the horizontal direction that are applied to counteract the forces that may be imparted by the wind on the aerial vehicle (e.g., to maintain stable VTOL/hover flight and/or minimize tracking error, etc.). For example, the estimated wind direction may be inferred using the azimuth of one of the state vectors of the horizontal integrator.

In step 612, it can be determined whether the estimated wind magnitude is above a threshold value. According to exemplary embodiments, hysteresis logic may determine a threshold value below which active weathervaning may be disabled. In exemplary implementations, if it is determined that the magnitude of the wind is under the determined threshold value, active weathervaning may be disabled so as to avoid repeated changes and/or large changes to the orientation/heading of the aerial vehicle in poorly defined wind conditions. Accordingly, process 600 returns to step 602 to continue performing low-speed, VTOL/hover flight.

If the estimated wind magnitude is at or above the threshold value, it can be determined, in step 614, whether the aerial vehicle is oriented in the preferred relative orientation, which was determined in step 608. If the aerial vehicle is already oriented in the preferred relative orientation with respect to the estimated wind direction, process 600 returns to step 602 to continue performing low-speed, VTOL/hover flight.

However, if the aerial vehicle is not oriented in the preferred relative orientation with respect to the estimated wind direction, a command may be generated to actively change the heading of the aerial vehicle to align the aerial vehicle in the preferred relative orientation, as in step 616. This may be performed based on the preferred relative orientation, which was determined in step 608, and the estimated wind direction, which was determined in step 610.

Figure 7:
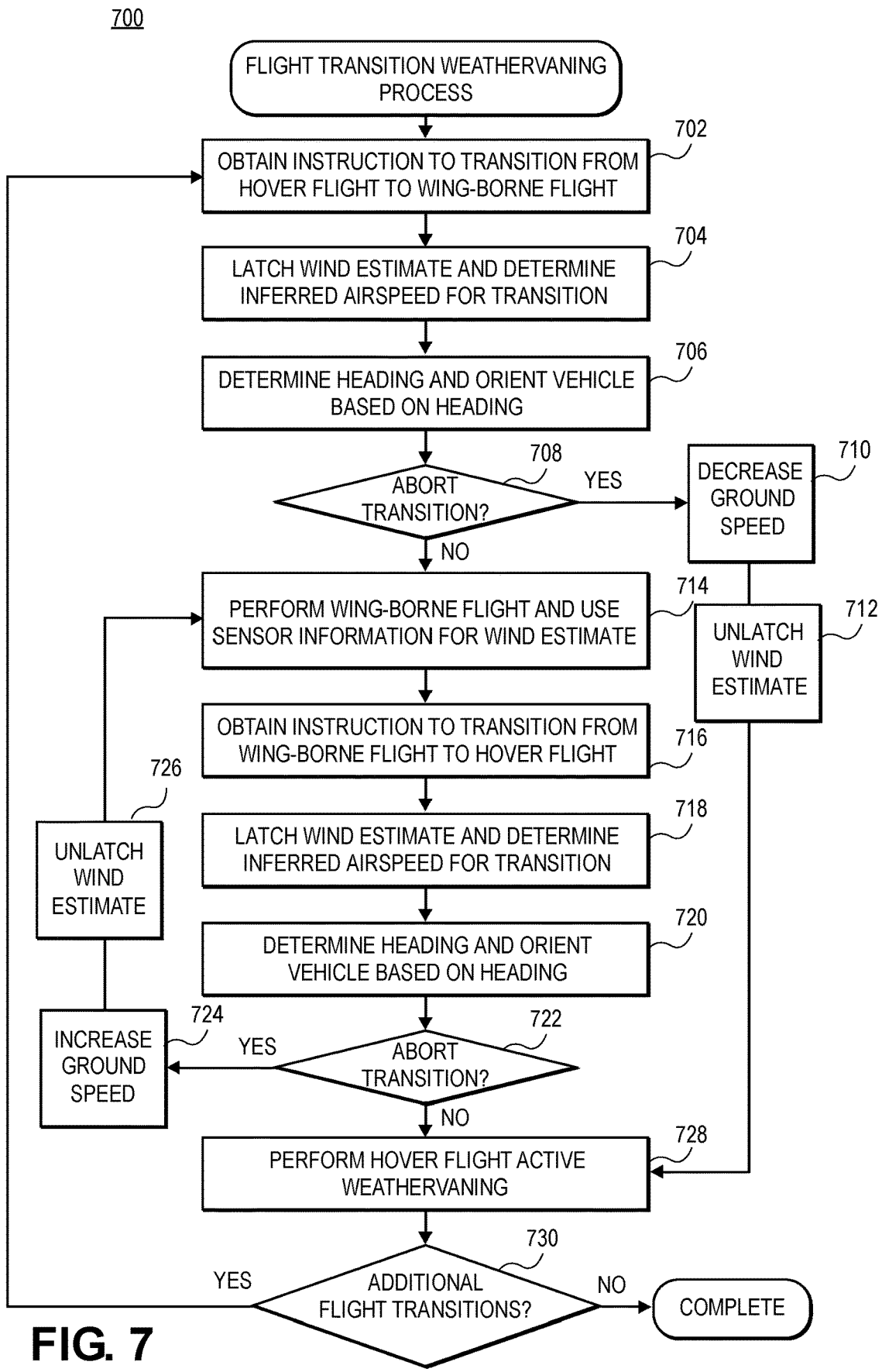
FIG. 7 is a flow diagram of an exemplary flight transition weathervaning process, according to exemplary embodiments of the present disclosure.

FIG. 7 is a flow diagram of an exemplary flight transition weathervaning process 700, according to exemplary embodiments of the present disclosure. Process 700 may be performed by an aerial vehicle, such as aerial vehicle 100, as it transitions between low-speed, VTOL/hover flight and high-speed, fixed-wing, wing-borne, horizontal flight.

As shown in FIG. 7, process 700 may begin with the aerial vehicle obtaining an instruction to transition from low-speed, VTOL/hover flight to high-speed, fixed-wing, wing-borne, horizontal flight, as in step 702.

In step 704, the aerial vehicle may latch the estimated wind direction during the transition from low-speed, VTOL/hover flight to high-speed, fixed-wing, wing-borne, horizontal flight and an inferred airspeed may be determined. For example, the estimated wind direction and magnitude, may be latched by the flight controller. Accordingly, the latched wind estimate (e.g., direction and magnitude) may be combined with a ground vector to determine an inferred airspeed, which may be used to compute a heading (e.g., in the preferred relative orientation) and a command may be generated to actively orient the aerial vehicle in accordance with the computed heading. Accordingly, as the aerial vehicle transitions from low-speed, VTOL/hover flight to high-speed, fixed-wing, wing-borne, horizontal flight, the aerial vehicle may orient itself from an orientation for low-speed, VTOL/hover flight (e.g., where the fuselage is in a substantially vertical orientation) to an orientation for high-speed, fixed-wing, wing-borne, horizontal flight (e.g., where the fuselage is in a substantially horizontal orientation). As the orientation of the vehicle is transitioning from low-speed, VTOL/hover flight to high-speed, fixed-wing, wing-borne, horizontal flight, the aerial vehicle will experience an increase in ground speed, and the ground speed vector may be combined with the latched wind estimate (e.g., via vector addition) to determine an inferred airspeed of the vehicle during the transition. Accordingly, the aerial vehicle may determine a heading based on the inferred airspeed, which was determined based on the latched wind estimate and the increasing ground speed during the transition, and the vehicle may orient itself in accordance with the heading, as in step 706.

Further, the inferred airspeed of the aerial vehicle during the transition may change as a function of ground speed during the transition from low-speed, VTOL/hover flight to high-speed, fixed-wing, wing-borne, horizontal flight (e.g., as the aerial vehicle experiences an increase in ground speed, the inferred airspeed, which is determined based on vector addition of the latched inferred airspeed and the ground speed, will change). Accordingly, the heading of the aerial vehicle may be continuously adjusted based on changes in the inferred airspeed (e.g., based on the changing ground speed) during the transition.

Additionally, as the aerial vehicle is transitioning from low-speed, VTOL/hover flight to high-speed, fixed-wing, wing-borne, horizontal flight, it may be determined whether the transition should be aborted, as in step 708. For example, operational conditions associated with the aerial vehicle (e.g., objects in the flight path, severe weather, change in mission, etc.) may cause the transition to be aborted. If the transition is to be aborted, the aerial vehicle may decrease its ground speed (e.g., to return to low-speed, VTOL/hover flight), as in step 710, and the wind estimate that was latched prior to the transition may be unlatched, as in step 712. Process 700 may then proceed to step 728, where the aerial vehicle may resume low-speed, VTOL/hover flight with active weathervaning.

Alternatively, if the transition is not to be aborted, the aerial vehicle may continue to transition to high-speed, fixed-wing, wing-borne, horizontal flight. Once the aerial vehicle has transitioned to high-speed, fixed-wing, wing-borne, horizontal flight, during horizontal flight, the estimated wind direction and magnitude may be unlatched, and the wind direction and magnitude may be determined based on sensor information received from a plurality of sensors (e.g., Kiel probes, pitot tubes, global positioning system sensors, and the like), as in step 714.

In step 716, the aerial vehicle may obtain an instruction to transition from high-speed, fixed-wing, wing-borne, horizontal flight to low-speed, VTOL/hover flight. The latest wind estimate determined during high-speed, fixed-wing, wing-borne, horizontal flight prior to entering the transition from high-speed, fixed-wing, wing-borne, horizontal flight to low-speed, VTOL/hover flight may be obtained and latched, as in step 718. Further, the latched wind estimate may be combined with the vehicle's ground speed through the transition to low-speed, VTOL/hover flight and during a buffer period after the transition has been completed. Similar to the transition from low-speed, VTOL/hover flight to high-speed, fixed-wing, wing-borne, horizontal flight, as the aerial vehicle transitions from high-speed, fixed-wing, wing-borne, horizontal flight to low-speed, VTOL/hover flight, the aerial vehicle may orient itself from an orientation for high-speed, fixed-wing, wing-borne, horizontal flight (e.g., where the fuselage is in a substantially horizontal orientation) to an orientation for low-speed, VTOL/hover flight (e.g., where the fuselage is in a substantially vertical orientation). Accordingly, as the orientation of the vehicle is transitioning from high-speed, fixed-wing, wing-borne, horizontal flight, to low-speed, VTOL/hover flight, the aerial vehicle will experience a decrease in ground speed, and the ground speed vector may be combined with the latched wind estimate (e.g., via vector addition) to determine an inferred airspeed of the vehicle during the transition. Accordingly, a heading may be determined based on the inferred airspeed, and the aerial vehicle may adjust its heading based on the determined heading, as in step 720.

Further, the inferred airspeed of the aerial vehicle during the transition may change as a function of ground speed during the transition from high-speed, fixed-wing, wing-borne, horizontal flight to low-speed, VTOL/hover flight (e.g., as the aerial vehicle experiences a decrease in ground speed, the inferred airspeed, which is determined based on vector addition of the latched inferred airspeed and the ground speed, will change). Accordingly, the heading of the aerial vehicle may be continuously adjusted based on the change in the inferred airspeed (e.g., based on the changing ground speed) during the transition.

Further, it may also be determined whether the transition from high-speed, fixed-wing, wing-borne, horizontal flight to low-speed, VTOL/hover flight should be aborted, as in step 722. If the transition is to be aborted, the aerial vehicle may increase its ground speed (e.g., to return to high-speed, fixed-wing, wing-borne, horizontal flight), as in step 724, and the wind estimate may be unlatched, as in step 726. Process 700 may return to step 714, and the aerial vehicle may resume high-speed, fixed-wing, wing-borne, horizontal flight. If the transition is to be completed, the latched wind estimate remains latched through the buffer period, which may allow the feedback flight control information generated by the flight controller (e.g., the horizontal integrators) to stabilize before active weathervaning for low-speed, VTOL/hover flight is performed again, as in step 728. In step 730, it can be determined if a further transition to high-speed, fixed-wing, wing-borne, horizontal flight is to be performed. If an additional flight transition is to be performed, process 700 returns to step 702.

Figure 8:
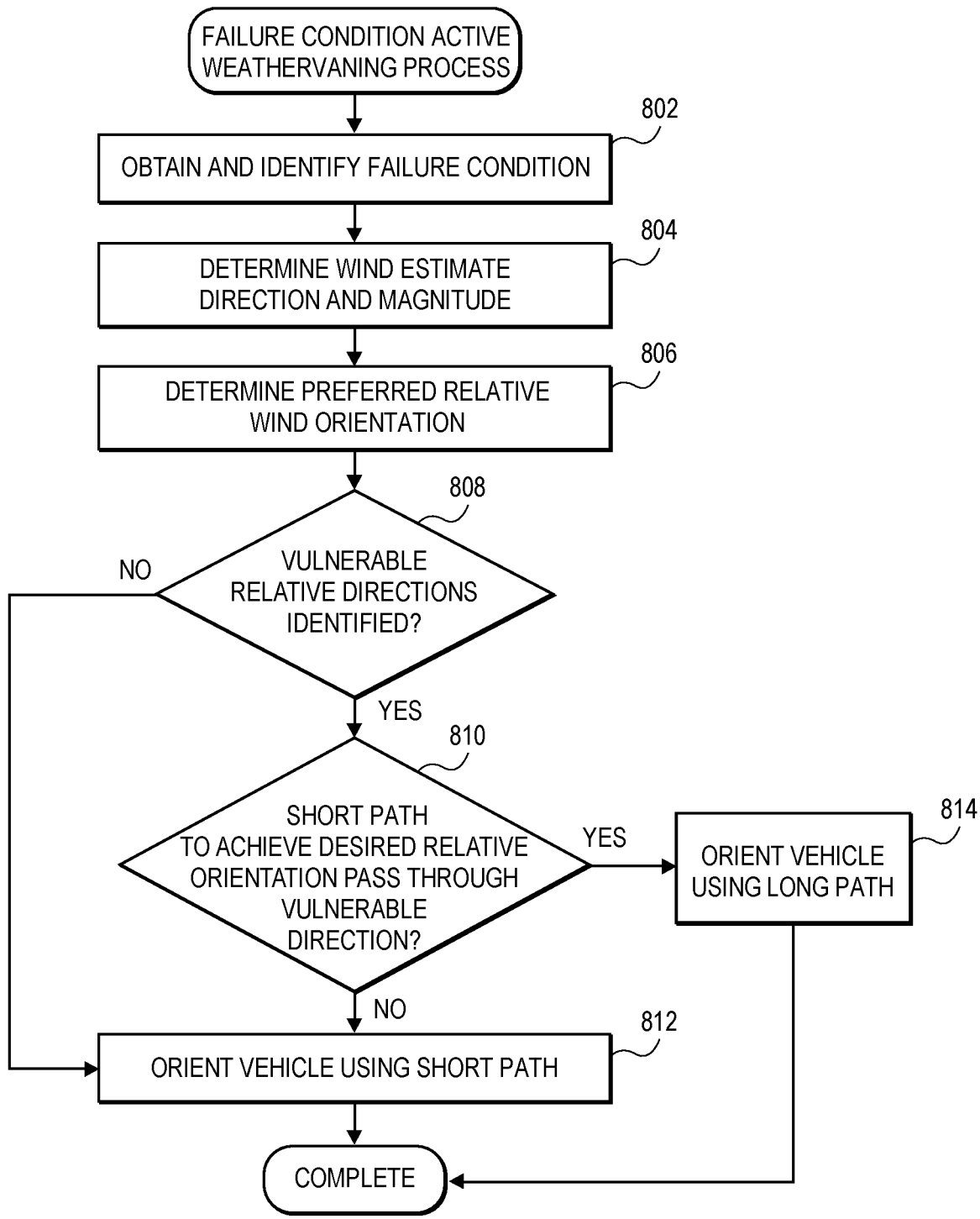
FIG. 8 is a flow diagram of an exemplary failure condition active weathervaning process, according to exemplary embodiments of the present disclosure.

FIG. 8 is a flow diagram of an exemplary failure condition active weathervaning process 800, according to exemplary embodiments of the present disclosure. Process 800 may be performed by an aerial vehicle, such as aerial vehicle 100, during low-speed, VTOL/hover flight.

As shown in FIG. 8, process 800 may begin with the aerial vehicle obtaining and identifying a failure condition, as in step 802. This can include, for example, a failure of one or more propulsion mechanism(s) and an identification of which propulsion mechanism(s) have failed. For example, in exemplary implementations where the aerial vehicle is aerial vehicle 100, it may be determined which of propulsion mechanisms 102-1, 102-2, 102-3, 102-4, 102-5, and/or 102-6 is experiencing a failure condition.

An estimated wind direction and magnitude may be determined, as in step 804. According to exemplary embodiments of the present disclosure, the aerial vehicle may obtain feedback flight control information from a horizontal integrator of a flight controller. The feedback flight control information may include flight commands issued for the horizontal direction that are applied to counteract the forces that may be imparted by the wind on the aerial vehicle (e.g., to maintain stable VTOL/hover flight and/or minimize tracking error, etc.). For example, the estimated wind direction may be inferred using the azimuth of one of the state vectors of the horizontal integrator.

Next, in step 806, the preferred orientation of the aerial vehicle relative to the wind direction can be determined. For example, the preferred orientation can be determined based on the existing failure condition, as identified in step 802. According to aspects of the present disclosure, the aerial vehicle may have a specific preferred relative orientation to the wind direction for each combination of propulsion mechanism failure conditions.

In step 808, it can be determined whether any vulnerable orientations relative to the wind direction may exist for the aerial vehicle in view of the failure condition. This can include, for example, a relative wind direction which may present aerodynamic challenges to the aerial vehicle, which can result in degraded tracking performance and/or loss of control of the aerial vehicle.

If no vulnerable relative orientations exist, process 800 may proceed to step 812, where a command may be generated to actively change the heading of the aerial vehicle to align and orient the aerial vehicle in the preferred relative orientation determined in step 806 using the short path to achieve the preferred relative orientation. However, if the short path to achieve alignment of the aerial vehicle in the preferred relative orientation includes a vulnerable direction, a command may be generated to actively change the heading of the aerial vehicle to align and orient the aerial vehicle in the preferred relative orientation determined in step 806 using the long path, as in step 814.

Figure 9:
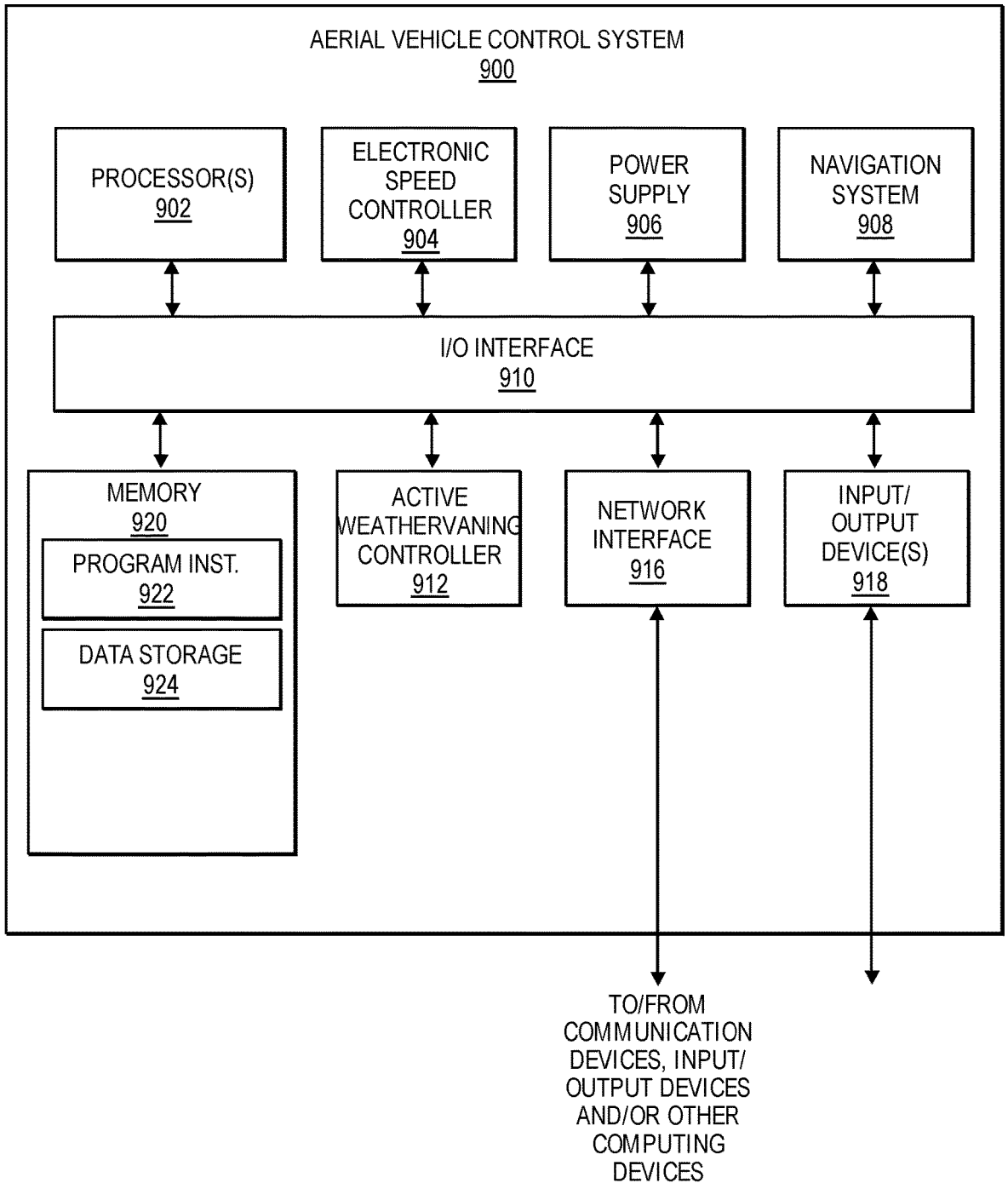
FIG. 9 is a block diagram illustrating various components of an exemplary aerial vehicle control system, according to exemplary embodiments of the present disclosure.

FIG. 9 is a block diagram illustrating various components of an exemplary aerial vehicle control system 900, according to exemplary embodiments of the present disclosure.

In various examples, the block diagram may be illustrative of one or more aspects of the aerial vehicle control system 900 that may be used to implement the various systems and processes discussed above. In the illustrated implementation, the aerial vehicle control system 900 includes one or more processors 902, coupled to a non-transitory computer readable storage medium 920 via an input/output (I/O) interface 910. The aerial vehicle control system 900 may also include an electronic speed controller 904, a power supply or battery 906, and/or a navigation system 908. The aerial vehicle control system 900 may further include an active weathervaning controller 912, a network interface 916, and one or more input/output devices 918.

In various implementations, the aerial vehicle control system 900 may be a uniprocessor system including one processor 902, or a multiprocessor system including several processors 902 (e.g., two, four, eight, or another suitable number). The processor(s) 902 may be any suitable processor capable of executing instructions. For example, in various implementations, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 902 may commonly, but not necessarily, implement the same ISA.

The non-transitory computer readable storage medium 920 may be configured to store executable instructions, data, and sensor calibration data and/or characteristics, including environment properties data, sensor environment properties data, light properties data, particle properties data, nominal spectral characteristics of imaging sensors, current spectral characteristics of imaging sensors, differences between nominal and current spectral characteristics of imaging sensors, calibrations of spectral characteristics of imaging sensors, correlations or mappings between various of the data, and/or other data items accessible by the processor(s) 902. In various implementations, the non-transitory computer readable storage medium 920 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 920 as program instructions 922, and data storage 924, respectively. In other implementations, program instructions and/or stored data may be received, sent or stored upon different types of computer-accessible media, such as non-transitory media, or on similar media separate from the non-transitory computer readable storage medium 920 or the aerial vehicle control system 900.

Generally, a non-transitory, computer readable storage medium may include storage media or memory media such as magnetic or optical media, e.g., disk or CD/DVD-ROM, coupled to the aerial vehicle control system 900 via the I/O interface 910. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 916.

In one implementation, the I/O interface 910 may be configured to coordinate I/O traffic between the processor(s) 902, the non-transitory computer readable storage medium 920, and any peripheral devices, the network interface or other peripheral interfaces, such as input/output devices 918. In some implementations, the I/O interface 910 may perform any necessary protocol, timing or other data transformations to convert data signals from one component (e.g., non-transitory computer readable storage medium 920) into a format suitable for use by another component (e.g., processor(s) 902). In some implementations, the I/O interface 910 may include support for devices attached through various types of peripheral buses, such as a variant of the Peripheral Component Interconnect (PCI) bus standard or the Universal Serial Bus (USB) standard, for example. In some implementations, the function of the I/O interface 910 may be split into two or more separate components, such as a north bridge and a south bridge, for example. Also, in some implementations, some or all of the functionality of the I/O interface 910, such as an interface to the non-transitory computer readable storage medium 920, may be incorporated directly into the processor(s) 902.

The electronic speed controller 904 communicates with the navigation system 908 and adjusts the operational characteristics of each propulsion mechanism to guide the aerial vehicle along a determined path and/or to perform other navigational maneuvers. The navigation system 908 may include a GPS, IMU, altimeter, speed sensors, or other similar system than can be used to navigate the aerial vehicle to and/or from a location.

The aerial vehicle control system 900 may also include an active weathervaning controller 912 that communicates with the processor(s) 902, the non-transitory computer readable storage medium 920, one or more imaging sensors, and/or other components or systems described herein to determine inferred and/or estimated wind and/or airspeed conditions, failure conditions, and/or perform other actions, functions, operations, or processes described herein.

The network interface 916 may be configured to allow data to be exchanged between the aerial vehicle control system 900, other devices attached to a network, such as other computer systems, imaging sensors, and/or control systems of other vehicles, systems, machines, equipment, apparatuses, systems, or devices. For example, the network interface 916 may enable wireless communication between numerous aerial vehicles. In various implementations, the network interface 916 may support communication via wireless general data networks, such as a Wi-Fi network. For example, the network interface 916 may support communication via telecommunications networks such as cellular communication networks, satellite networks, and the like.

Input/output devices 918 may, in some implementations, include one or more displays, imaging sensors, image capture devices, thermal sensors, infrared sensors, time of flight sensors, accelerometers, pressure sensors, weather sensors, various other sensors described herein, etc. Multiple input/output devices 918 may be present and controlled by the aerial vehicle control system 900. One or more of these sensors may be utilized to assist in performing the various functions, operations, and processes described herein.

As shown in FIG. 9, the memory may include program instructions 922, which may be configured to implement the example processes and/or sub-processes described above. The data storage 924 may include various data stores for maintaining data items that may be provided for performing the various functions, operations, and processes described herein. For example, the data storage 924 may trajectory/flight path/planning, wind data, preferred orientation data, failure condition data, flight transition data, vulnerable orientation data, and/or other data items.

Although some of the embodiments disclosed herein reference the operation of unmanned aerial vehicles having stereo pairs of digital cameras, those of ordinary skill in the pertinent arts will recognize that the systems and methods disclosed herein are not so limited, and may be utilized with any type of or other machine vision system capturing a stream of images.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIGS. 6, 7, and 8, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle (UAV), comprising:
a plurality of propulsion mechanisms; and
a flight controller configured to, during hover flight of the UAV, at least:
identify a failure condition associated with at least one propulsion mechanism from the plurality of propulsion mechanisms;
determine, based at least in part on the failure condition, a preferred orientation of the UAV for the identified failure condition relative to a wind direction of a wind;
determine, without assistance from a wind sensor and based at least in part on feedback flight control information, an estimated wind direction, wherein the feedback flight control information includes flight control parameters used to counteract forces imparted by the wind on the UAV; and
generate, based at least in part on the estimated wind direction, a command to orient a heading of the UAV to align with the preferred orientation of the UAV relative to the estimated wind direction.

2. The UAV of claim 1, wherein the flight controller is further configured to, at least:
determine an estimated wind magnitude of the wind; and
determine that the estimated wind magnitude exceeds a threshold value,
wherein generation of the command to orient the heading of the UAV is further based at least in part on the determination that the estimated wind magnitude is above the threshold value.

3. The UAV of claim 1, wherein the feedback flight control information is obtained from at least one horizontal integrator of the flight controller.

4. The UAV of claim 1, wherein the flight controller is further configured to, at least:
determine at least one vulnerable relative orientation of the UAV, and
wherein generation of the command to orient the heading of the UAV is further based at least in part on the determination of the at least one vulnerable relative orientation of the UAV.

5. The UAV of claim 1, further comprising:
a fuselage; and
a ring-wing,
wherein:
the fuselage is positioned in a canted orientation relative to the ring-wing; and
the plurality of propulsion mechanisms includes six canted propulsion mechanisms.

6. The UAV of claim 1, wherein:
the failure condition is one of a plurality of failure conditions; and
each of the plurality of failure conditions is associated with a corresponding preferred orientation of the UAV relative to the estimated wind direction.

7. A method to provide active weathervaning for an aerial vehicle, comprising:
during hover flight of the aerial vehicle:
obtaining flight control information from at least one horizontal flight controller;
determining, without assistance from a wind sensor and based at least in part on the flight control information, an estimated wind direction of a wind, wherein the flight control information includes flight control parameters used to counteract forces imparted by the wind on the aerial vehicle;
determining a preferred orientation of the aerial vehicle relative to the estimated wind direction; and
causing the aerial vehicle to adjust its heading so as to align the aerial vehicle with the preferred orientation of the aerial vehicle relative to the estimated wind direction.

8. The method of claim 7, further comprising:
obtaining an instruction to transition from hover flight to wing-borne flight;
determining an estimated wind magnitude;
latching the estimated wind direction and the estimated wind magnitude during a transition from hover flight to wing-borne flight;
determining a transition heading based at least in part on the latched estimated wind direction, the latched estimated wind magnitude, the preferred orientation of the aerial vehicle, and a ground speed of the aerial vehicle;
causing the aerial vehicle to be oriented according to the transition heading; and
unlatching the estimated wind direction and the estimated wind magnitude as the aerial vehicle enters wing-borne flight.

9. The method of claim 8, further comprising:
determining, using a hysteresis algorithm, an estimated wind magnitude threshold;
determining that the estimated wind magnitude exceeds the estimated wind magnitude threshold,
wherein:
the estimated wind magnitude is determined without assistance from a wind sensor and is based at least in part on a correlation between the flight control information and an air density estimation; and
causing the aerial vehicle to be oriented according to the transition heading is based at least in part on the determination that the estimated wind magnitude exceeds the estimated wind magnitude threshold.

10. The method of claim 7, further comprising:
during wing-borne flight:
obtaining an instruction to transition from wing-borne flight to hover flight;
latching a second estimated wind direction and a second estimated wind magnitude determined during wing-borne flight during a transition from wing-borne flight to hover flight;
determining a transition heading based at least in part on the latched second estimated wind direction, the second estimated wind magnitude, the preferred orientation of the aerial vehicle, and a ground speed of the aerial vehicle;
causing the aerial vehicle to be oriented according to the transition heading during the transition from wing-borne flight to hover flight;
causing the aerial vehicle to be oriented according to the transition heading during a buffer period after the transition from wing-borne flight to hover flight; and
subsequent to an end of the buffer period and during hover flight:
obtaining second flight control information from the at least one horizontal flight controller;
determining, without assistance from a wind sensor and based at least in part on the second flight control information, a third estimated wind direction;
determining a second preferred orientation of the aerial vehicle relative to the third estimated wind direction; and
causing the aerial vehicle to adjust its heading so as to align the aerial vehicle with the second preferred orientation of the aerial vehicle relative to the third estimated wind direction.

11. The method of claim 7, further comprising:
determining a failure condition associated with at least one propulsion mechanism associated with the aerial vehicle;
determining, based at least in part on the failure condition, a second preferred orientation of the aerial vehicle for the determined failure condition relative to the estimated wind direction; and
causing the aerial vehicle to adjust its heading so as to align the aerial vehicle with the second preferred orientation of the aerial vehicle relative to the estimated wind direction.

12. The method of claim 11, wherein:
the failure condition is one of a plurality of failure conditions; and
each of the plurality of failure conditions is associated with a corresponding preferred orientation of the aerial vehicle relative to the estimated wind direction.

13. The method of claim 7, wherein:
the aerial vehicle includes:
a fuselage;
a ring-wing; and
six canted propulsion mechanisms,
wherein the fuselage is positioned in a canted orientation relative to the ring-wing.

14. The method of claim 7, further comprising:
determining, using a hysteresis algorithm, an estimated wind magnitude threshold;
determining, without assistance from a wind sensor and based at least in part on the flight control information, an estimated wind magnitude; and
determining that the estimated wind magnitude exceeds the estimated wind magnitude threshold,
wherein causing the aerial vehicle to adjust its heading so as to align the aerial vehicle with the preferred orientation of the aerial vehicle relative to the estimated wind direction is based at least in part on the determination that the estimated wind magnitude exceeds the estimated wind magnitude threshold.

15. The method of claim 7, further comprising:
determining at least one vulnerable relative orientation of the aerial vehicle, and
wherein causing the aerial vehicle to adjust its heading so as to align the aerial vehicle with the preferred orientation of the aerial vehicle relative to the estimated wind direction is further based at least in part on the determination of the at least one vulnerable relative orientation of the aerial vehicle.

16. A method to provide active weathervaning for an aerial vehicle, comprising:
during hover flight:
obtaining flight control information from at least one horizontal flight controller, where in the flight control information includes flight control parameters used to counteract forces imparted by a wind on the aerial vehicle;
determining, without assistance from a wind sensor and based at least in part on the flight control information, an estimated wind;
determining a preferred orientation of the aerial vehicle relative to the estimated wind;
obtaining an instruction to transition from hover flight to horizontal flight;
latching the estimated wind during a transition from hover flight to horizontal flight;
determining a transition heading based at least in part on the latched estimated wind, the preferred orientation of the aerial vehicle, and a ground speed of the aerial vehicle;
causing the aerial vehicle to be oriented according to the transition heading;
updating the transition heading to generate a second transition heading based on a change to the ground speed of the aerial vehicle;
causing the aerial vehicle to be oriented according to the second transition heading; and
unlatching the estimated wind as the aerial vehicle begins horizontal flight.

17. The method of claim 16, further comprising:
obtaining an instruction to transition from horizontal flight to hover flight;
latching a second estimated wind determined during horizontal flight so that the second estimated wind is latched during a second transition from horizontal flight to hover flight;
determining a third transition heading based at least in part on the latched second estimated wind, the preferred orientation of the aerial vehicle, and a second ground speed of the aerial vehicle;
causing the aerial vehicle to be oriented according to the third transition heading;
updating the third transition heading to generate a fourth transition heading based on a change to the second ground speed of the aerial vehicle;
causing the aerial vehicle to be oriented according to the fourth transition heading; and
causing the aerial vehicle to be oriented according to the fourth transition heading during a buffer period after the transition from horizontal flight to hover flight.

18. The method of claim 17, further comprising:
obtaining second flight control information from the at least one horizontal flight controller;
determining, without assistance from a wind sensor and based at least in part on the second flight control information, a second estimated wind;
determining a second preferred orientation of the aerial vehicle relative to the second estimated wind; and
causing the aerial vehicle to adjust its heading so as to align the aerial vehicle with the second preferred orientation of the aerial vehicle relative to the second estimated wind.

19. The method of claim 16, further comprising:
determining a failure condition associated with at least one propulsion mechanism associated with the aerial vehicle;
determining, based at least in part on the failure condition, a second preferred orientation of the aerial vehicle for the determined failure condition relative to the estimated wind; and
causing the aerial vehicle to adjust its heading so as to align the aerial vehicle with the second preferred orientation of the aerial vehicle relative to the estimated wind.

20. The method of claim 16, wherein:
the aerial vehicle includes:
   a fuselage;
   a ring-wing; and
   six canted propulsion mechanisms,
wherein the fuselage is positioned in a canted orientation relative to the ring-wing.

* * * * *